(12) United States Patent
Arai

(10) Patent No.: US 8,699,856 B2
(45) Date of Patent: Apr. 15, 2014

(54) EDITING APPARATUS, EDITING METHOD, PROGRAM, AND RECORDING MEDIUM

(75) Inventor: Hideki Arai, Knagawa (JP)

(73) Assignee: Sony Corporation, Tokyo (JP)

(*) Notice: Subject to any disclaimer, the term of this patent is extended or adjusted under 35 U.S.C. 154(b) by 1378 days.

(21) Appl. No.: 12/198,369

(22) Filed: Aug. 26, 2008

(65) Prior Publication Data

US 2009/0080854 A1 Mar. 26, 2009

(30) Foreign Application Priority Data

Sep. 20, 2007 (JP) ................................. 2007-243392

(51) Int. Cl.
*H04N 5/93* (2006.01)
*H04N 7/12* (2006.01)

(52) U.S. Cl.
USPC ........... 386/278; 386/280; 386/281; 386/288; 375/240.01; 375/240.26

(58) Field of Classification Search
USPC ............. 386/278, 280, 281, 288; 375/240.01, 375/240.26
See application file for complete search history.

(56) References Cited

U.S. PATENT DOCUMENTS

| | | | |
|---|---|---|---|
| 5,696,557 A | 12/1997 | Yamashita et al. | |
| 5,825,965 A * | 10/1998 | Kizu | 386/280 |
| 5,835,662 A | 11/1998 | Inoue et al. | |
| 6,301,428 B1 * | 10/2001 | Linzer | 386/278 |
| 6,414,998 B1 | 7/2002 | Yoshinari et al. | |
| 6,414,999 B1 | 7/2002 | Igi et al. | |
| 6,522,693 B1 * | 2/2003 | Lu et al. | 375/240.02 |
| 6,529,550 B2 | 3/2003 | Tahara et al. | |
| 6,529,555 B1 | 3/2003 | Saunders et al. | |
| 6,535,251 B1 * | 3/2003 | Ribas-Corbera | 375/240.03 |
| 6,567,471 B1 | 5/2003 | Yoshinari | |
| 7,020,381 B1 * | 3/2006 | Kato et al. | 386/280 |
| 2001/0020953 A1 * | 9/2001 | Moriwake et al. | 345/723 |
| 2001/0021267 A1 * | 9/2001 | Jun et al. | 382/165 |
| 2002/0176690 A1 * | 11/2002 | Nagasawa | 386/52 |
| 2003/0234803 A1 * | 12/2003 | Toyama et al. | 345/716 |
| 2005/0002454 A1 * | 1/2005 | Ueno et al. | 375/240.03 |
| 2005/0053356 A1 * | 3/2005 | Mate et al. | 386/52 |
| 2006/0045188 A1 * | 3/2006 | Fuchie | 375/240.26 |
| 2006/0045467 A1 | 3/2006 | Fuchie | |
| 2006/0059426 A1 * | 3/2006 | Ogikubo | 715/723 |
| 2007/0263979 A1 * | 11/2007 | Kihara et al. | 386/64 |

(Continued)

FOREIGN PATENT DOCUMENTS

WO WO 2006/022221 A1 3/2006

*Primary Examiner* — Philip Chea
*Assistant Examiner* — Shanto M Abedin
(74) *Attorney, Agent, or Firm* — Oblon, Spivak, McClelland, Maier & Neustadt, L.L.P.

(57) ABSTRACT

An editing apparatus that executes editing processing with an encoded stream as an edit material is disclosed. The apparatus includes: an input means for receiving an operation input for designating the edit material used for editing, an editing effect, and start and end timing of the editing effect; an editing processing unit setting means for setting an editing processing unit of the edit material such that the editing effect at least a part of which until the editing effect ends after starting of the editing effect overlaps is included in one editing processing unit; a minimum encoding section setting means for setting a minimum encoding section; and an after-editing stream creating means for creating a part of an after-editing encoded stream by decoding the edit material, giving the editing effect included in the editing processing unit, and performing encoding on the basis of setting of the minimum encoding section.

19 Claims, 31 Drawing Sheets

(56) References Cited

U.S. PATENT DOCUMENTS

2007/0286289 A1* 12/2007 Arai et al. ............... 375/240.26
2008/0019444 A1* 1/2008 Fuchie et al. ............ 375/240.12
2008/0056383 A1* 3/2008 Ueki et al. ............... 375/240.26

* cited by examiner

CUT POINT (OVERLAPPING ELEMENT)

MATERIAL BEFORE START OF OVERLAPPING ELEMENT | MATERIAL AFTER END OF OVERLAPPING ELEMENT

CUT POINT (OVERLAPPING ELEMENT)

OPERATION END FRAME | OPERATION START FRAME

EFFECT (OVERLAPPING ELEMENT)

MATERIAL BEFORE START OF OVERLAPPING ELEMENT/
MATERIAL AFTER END OF OVERLAPPING ELEMENT

OPERATION START FRAME
α

END TIME FRAME

OPERATION END FRAME
β

EFFECT
(OVERLAPPING ELEMENT)

MATERIAL BEFORE START OF OVERLAPPING ELEMENT/
MATERIAL AFTER END OF OVERLAPPING ELEMENT

CUT POINT (OVERLAPPING ELEMENT)
AND EFFECT (OVERLAPPING ELEMENT)

FIG. 25

| OVERLAPPING ELEMENT | START TIME |
|---|---|
| | END TIME |
| CUT 1 | 00:00:20:00 |
| | 00:00:20:00 |
| WIPE | 00:00:53:01 |
| | 00:00:57:10 |
| CUT 2 | 00:00:55:08 |
| | 00:00:55:08 |
| CUT 3 | 00:01:25:16 |
| | 00:01:25:16 |
| CUT 4 | 00:01:45:05 |
| | 00:01:45:05 |
| TELOP | 00:02:00:01 |
| | 00:02:57:12 |
| CUT 5 | 00:02:15:24 |
| | 00:02:15:24 |
| CUT 6 | 00:02:45:06 |
| | 00:02:45:06 |
| MOSAIC | 00:02:49:01 |
| | 00:03:07:12 |
| CUT 7 | 00:03:20:13 |
| | 00:03:20:13 |
| CUT 8 | 00:03:55:23 |
| | 00:03:55:23 |

FIG. 26

| EDIT ELEMENT BLOCK | START TIME / END TIME | OVERLAPPING ELEMENT | CONSTITUENT MATERIAL |
|---|---|---|---|
| 1 | 00:00:20:00 / 00:00:20:00 | CUT 1 | (1) / (2) |
| 2 | 00:00:53:01 | WIPE | (2) / (3) |
| 2 | 00:00:55:08 | CUT 2 | |
| 3 | 00:01:25:16 / 00:01:25:16 | CUT 3 | (3) / (4) |
| 4 | 00:01:45:05 / 00:01:45:05 | CUT 4 | (4) / (5) |
| 5 | 00:02:00:01 | TELOP | (5) / (6) |
| 5 | 00:02:00:01 | CUT 5 | (7) |
| 5 | 00:03:07:12 | CUT 6 | |
| 5 | 00:03:07:12 | MOSAIC | |
| 6 | 00:03:20:13 / 00:03:20:13 | CUT 7 | (7) / (8) |
| 7 | 00:03:55:23 / 00:03:55:23 | CUT 8 | (8) / (9) |

FIG. 27

| EDIT ELEMENT BLOCK | START TIME / END TIME | OVERLAPPING ELEMENT | CONSTITUENT MATERIAL | MINIMUM ENCODING SECTION | START TIME / END TIME |
|---|---|---|---|---|---|
| 1 | 00:00:20:00 / 00:00:20:00 | CUT 1 | (1) / (2) | 1 | 00:00:20:00 / 00:00:20:20 |
| 2 | 00:00:53:01 / 00:00:55:08 | WIPE | (2) / (3) | 2 | 00:00:52:18 / 00:00:55:12 |
|  |  | CUT 2 |  |  |  |
| 3 | 00:01:25:16 / 00:01:25:16 | CUT 3 | (3) / (4) | 3 | 00:01:25:08 / 00:01:25:25 |
| 4 | 00:01:45:05 / 00:01:45:05 | CUT 4 | (4) / (5) | 4 | 00:01:44:27 / 00:01:45:09 |
| 5 | 00:02:00:00:01 | TELOP | (5) / (6) / (7) | 5 | 00:01:59:18 |
|  |  | CUT 5 |  |  |  |
|  | 00:03:07:12 | CUT 6 |  |  | 00:03:07:20 |
|  |  | MOSAIC |  |  |  |
| 6 | 00:03:20:13 / 00:03:20:13 | CUT 7 | (7) / (8) | 6 | 00:03:20:07 / 00:03:20:26 |
| 7 | 00:03:55:23 / 00:03:55:23 | CUT 8 | (8) / (9) | 7 | 00:03:55:18 / 00:03:56:02 |

FIG. 28

| EDIT ELEMENT BLOCK | START TIME END TIME | OVERLAPPING ELEMENT | CONSTITUENT MATERIAL | MINIMUM ENCODING SECTION | START TIME END TIME |
|---|---|---|---|---|---|
| 1 | 00:00:20:00<br>00:00:20:00 | CUT 1 | (1)<br>(2) | 1☆ | 00:00:20:00<br>00:00:20:20 |
| 2 | 00:00:53:01 | WIPE | (2)<br>(3) | 2☆ | 00:00:52:18 |
|  | 00:00:55:08 | CUT 2 |  |  | 00:00:55:12 |
| 8 | 00:01:25:16<br>00:01:25:16 | CUT 3 | (3)<br>(4) | 8☆ | 00:01:25:08 |
|  | 00:01:45:05<br>00:01:45:05 | CUT 4 | (4)<br>(5) |  | 00:01:45:09 |
| 5 | 00:02:00:01 | TELOP | (5)<br>(6)<br>(7) | 5☆ | 00:01:59:18 |
|  |  | CUT 5 |  |  |  |
|  | 00:03:07:12 | CUT 6 |  |  | 00:03:07:20 |
|  |  | MOSAIC |  |  |  |
| 6 | 00:03:20:13<br>00:03:20:13 | CUT 7 | (7)<br>(8) | 6☆ | 00:03:20:07<br>00:03:20:26 |
| 7 | 00:03:55:23<br>00:03:55:23 | CUT 8 | (8)<br>(9) | 7☆ | 00:03:55:18<br>00:03:56:02 |

FIG. 29

| OVERLAPPING ELEMENT | START TIME / END TIME |
|---|---|
| CUT 1 | 00:00:20:00 / 00:00:20:00 |
| WIPE | 00:00:53:01 / 00:00:57:10 |
| CUT 2 | 00:00:55:08 / 00:00:55:08 |
| TELOP 2 | 00:00:59:00 / 00:01:30:01 |
| CUT 3 | 00:01:25:16 / 00:01:25:16 |
| CUT 4 | 00:01:45:05 / 00:01:45:05 |
| TELOP 1 | 00:02:00:01 / 00:02:57:12 |
| CUT 5 | 00:02:15:24 / 00:02:15:24 |
| CUT 6 | 00:02:45:06 / 00:02:45:06 |
| MOSAIC | 00:02:49:01 / 00:03:07:12 |
| CUT 7 | 00:03:20:13 / 00:03:20:13 |
| CUT 8 | 00:03:55:23 / 00:03:55:23 |

| EDIT ELEMENT BLOCK | START TIME / END TIME | OVERLAPPING ELEMENT | CONSTITUENT MATERIAL | MINIMUM ENCODING SECTION | START TIME / END TIME |
|---|---|---|---|---|---|
| 1 | 00:00:20:00 / 00:00:20:00 | CUT 1 | (1) | 1☆ | 00:00:20:00 / 00:00:20:20 |
| 2 | 00:00:53:01 / 00:00:55:08 / 00:00:55:08 | WIPE / CUT 2 | (2) / (2) (3) | 2☆ | 00:00:52:18 / 00:00:55:12 |
| 8 | 00:01:25:16 / 00:01:25:16 / 00:01:45:05 / 00:01:45:05 | CUT 3 / CUT 4 | (3) (4) / (4) (5) | 8☆ | 00:01:25:08 / 00:01:45:09 |
| 5 | 00:02:00:01 / 00:03:07:12 | TELOP / CUT 5 / CUT 6 / MOSAIC | (5) (6) (7) | 5☆ | 00:01:59:18 / 00:03:07:20 |
| 6 | 00:03:20:13 / 00:03:20:13 | CUT 7 | (7) (8) | 6☆ | 00:03:20:07 / 00:03:20:26 |
| 7 | 00:03:55:23 / 00:03:55:23 | CUT 8 | (8) (9) | 7☆ | 00:03:55:18 / 00:03:56:02 |

FIG. 30

| EDIT ELEMENT BLOCK | START TIME | END TIME | OVERLAPPING ELEMENT | CONSTITUENT MATERIAL | MINIMUM ENCODING SECTION | START TIME | END TIME |
|---|---|---|---|---|---|---|---|
| 1 | 00:00:20:00 | 00:00:20:00 | CUT 1 | (1) | 1☆ | 00:00:20:00 | 00:00:20:20 |
| 2 | 00:00:53:01 | 00:00:53:01 | WIPE | (2)(3) | 2☆ | 00:00:52:18 | |
| | 00:00:55:08 | 00:00:55:08 | CUT 2 | | | | 00:00:55:12 |
| 3 | 00:00:59:00 | 00:01:30:01 | TELOP 2 | (3)(4) | 3 | 00:00:58:55 | |
| | 00:01:25:16 | 00:01:25:16 | CUT 3 | (3)(4) | | | |
| | 00:01:45:05 | 00:01:45:05 | CUT 4 | (4)(5) | | | 00:01:45:09 |
| 5 | 00:02:00:01 | | TELOP 1 | (5)(6) | 5☆ | 00:01:59:18 | |
| | | | CUT 5 | (7) | | | |
| | 00:03:07:12 | | CUT 6 | | | | 00:03:07:20 |
| | | | MOSAIC | | | | |
| 6 | 00:03:20:13 | 00:03:20:13 | CUT 7 | (7)(8) | 6☆ | 00:03:20:07 | 00:03:20:26 |
| 7 | 00:03:55:23 | 00:03:55:23 | CUT 8 | (8)(9) | 7☆ | 00:03:55:18 | 00:03:56:02 |

EDITING APPARATUS, EDITING METHOD, PROGRAM, AND RECORDING MEDIUM

CROSS REFERENCES TO RELATED APPLICATIONS

The present invention contains subject matter related to Japanese Patent Application JP 2007-243392 filed in the Japanese Patent Office on Sep. 20, 2007, the entire contents of which being incorporated herein by reference.

BACKGROUND OF THE INVENTION

1. Field of the Invention

The present invention relates to an editing apparatus, an editing method, a program, and a recording medium and more particularly, to an editing apparatus, an editing method, a program, and a recording medium suitable for being used in performing editing processing with an encoded stream as a material.

2. Description of the Related Art

In the case where a plurality of streams encoded in the format of Long GOP, such as an MPEG2 (moving picture coding experts group/moving picture experts group2), are spliced at a splicing point or the like, there is a technique capable of avoiding omission of generation caused by repetition of decoding and encoding and reducing an edit result stream creating time by first decoding only a predetermined section near the splicing point, splicing the decoded sections at the splicing point, performing encoding processing such that VBVoccupancy is seamless in a decoded portion and a portion that is not decoded, and performing splicing with the portion that is not decoded (for example, refer to JP-A-2006-67095).

When omission of generation occurs due to repetition of decoding and encoding, there is a possibility that the image quality will deteriorate. In this case, by using the above-described technique disclosed in JP-A-2006-67095, it is possible to reduce a portion of an edit result stream with a possibility that the image quality will deteriorate.

In addition, there is a technique of editing a plurality of streams encoded in the format of Long GOP by using a time axis called a timeline. That is, a user disposes all materials used for editing (that is, encoded streams used for editing), an splicing point, an effect, and the like on the time axis called the timeline displayed on a predetermined display device, performs, for example, preview for checking the editing effect, and determines the edit elements. An editing apparatus can obtain a compressed motion picture signal after editing by first decoding all materials existing from the start time to the last time on the timeline, splicing decoded baseband signals according to the edit contents displayed on the timeline, and performing encoding after executing an editing effect or giving an effect with respect to the spliced baseband signals.

Summary of the Invention

In the case of the above-described editing operation using the timeline, in order to determine edit elements on the timeline, preview is repeated and encoding is performed through the whole region after deciding edit elements. Accordingly, it takes an extremely long time to obtain the encoded stream after editing from an operation input for editing. Furthermore, in the case when the edit contents obtained as a result are not satisfied, it was necessary to reconstruct the timeline to execute decoding and encoding in the whole region once again.

Moreover, in this method, one generation omission occurs in all portions since decoding and encoding are executed in the whole region of edit elements. As a result, the image quality deteriorates over the whole region.

Furthermore, in the case where decoding and encoding are performed only in a minimum portion as disclosed in JP-A-2006-67095, a portion where omission of generation occurs maybe reduced. Therefore, by applying the technique disclosed in JP-A-2006-67095 to the above-described editing operation using the timeline, a minimum portion in which decoding and encoding need to be performed is acquired for every edit element, such as a splicing point or an effect portion, and only the portion is sequentially decoded and encoded. In this case, decoding and encoding are needed in predetermined sections before and after each edit element. Accordingly, in the case when a distance between edit elements is very short, or according to the GOP structure of an edit material, there is a possibility that minimum portions, in which decoding and encoding need to be performed, generated for each edit element will overlap. As a result, unnecessary omission of generation may occur in the overlapping portion.

In addition, in the case where encoding is performed in the whole region after decision of edit elements on the timeline and then the edit elements are changed or increased or decreased, it was necessary to set a range before and after all splicing points where decoding and encoding are performed once again after reconstructing the timeline.

Therefore, in view of the above, it is desirable to reduce a portion where omission of generation occurs as much as possible and to make processing not complicated in an editing operation using a timeline even if edit elements are changed.

According to an embodiment of the present invention, an editing apparatus that executes editing processing with an encoded stream as an edit material includes: an input means for receiving an operation input for designating the edit material used for editing, an editing effect, and start and end timing of the editing effect; an editing processing unit setting means for setting an editing processing unit, which is a section in which decoding and encoding are to be performed, of the edit material on the basis of the edit material and the editing effect input by the input means such that the editing effect at least a part of which until the editing effect ends after the editing effect has started overlaps is included in one editing processing unit; a minimum encoding section setting means for setting a minimum encoding section that is a minimum encoding section required for encoding the editing processing unit set by the editing processing unit setting means; and an after-editing stream creating means for creating a part of an after-editing encoded stream by decoding the edit material, giving the editing effect included in the editing processing unit, and performing encoding on the basis of setting of the minimum encoding section of the editing processing unit set by the minimum encoding section setting means.

It is preferable to further include an edit information creating means for creating information regarding the editing processing unit set by the editing processing unit setting means and edit information in which the minimum encoding section of the editing processing unit set by the minimum encoding section setting means is described.

Furthermore, it is preferable to further include a storage means for storing the edit information created by the edit information creating means. Preferably, when an operation instructing a change in a part of the edit material and the editing effect is input from the input means, the editing processing unit setting means sets the editing processing unit by using information regarding the editing processing unit, in which the configuration of the edit material and the configuration of the editing effect are equal, of the edit information stored in the storage means, and the minimum encoding section setting means sets the minimum encoding section in the editing processing unit by using information regarding the editing processing unit, in which the configuration of the edit material and the configuration of the editing effect are equal, of the edit information stored in the storage means.

Furthermore, preferably, when a part of the plurality of minimum encoding sections set by the minimum encoding section setting means overlaps, the editing processing unit setting means resets the editing processing unit such that the editing processing unit corresponding to the overlapping minimum encoding section becomes one editing processing unit.

Furthermore, preferably, when a section including the plurality of editing processing units is encoded seamlessly in processing of the after-editing stream creating means for creating the after-editing encoded stream, the editing processing unit setting means resets the editing processing unit such that the plurality of editing processing units seamlessly encoded becomes one editing processing unit, and the minimum encoding section setting means sets the minimum encoding section in the reset editing processing unit.

Furthermore, preferably, the after-editing stream creating means creates a part of a first after-editing encoded stream corresponding to high-resolution image data and a part of a second after-editing encoded stream corresponding to low-resolution image data and executes encoding processing such that the second after-editing encoded stream created becomes ClosedGOP and an average amount of created codes per frame is equal.

Furthermore, preferably, the after-editing stream creating means executes encoding processing of the first and second after-editing encoded streams such that GOP phases of the first and second after-editing encoded streams are equal.

Furthermore, preferably, the after-editing stream creating means executes encoding processing of the first and second after-editing encoded streams in a condition where the minimum GOP length of the first after-editing encoded stream is set to be larger than a maximum GOP length of the second after-editing encoded stream.

Furthermore, preferably, when a section including the plurality of editing processing units is encoded seamlessly in processing of the after-editing stream creating means for creating the second after-editing encoded stream, the editing processing unit setting means resets the editing processing unit such that the plurality of editing processing units seamlessly encoded becomes one editing processing unit, and the minimum encoding section setting means sets the minimum encoding section in the reset editing processing unit.

Furthermore, it is preferable to further include a display control means for controlling display of a first timeline, in which the edit material used for editing and an editing effect are shown in a drawing and disposed on a time axis in a time-sequential manner, and a second timeline, in which information regarding the editing processing unit set by the editing processing unit setting means and the minimum encoding section of the editing processing unit set by the minimum encoding section setting means are disposed in a time-sequential manner so as to match the first timeline.

Furthermore, preferably, the display control means further controls display of information, which indicates whether or not the editing processing unit has been already encoded by the after-editing stream creating means, for every editing processing unit disposed on the second timeline.

Furthermore, preferably, the minimum encoding section setting means sets a start position of the minimum encoding section of the editing processing unit as a first frame of a GOP including a start frame of the editing effect with an earliest start time within the editing processing unit.

Furthermore, preferably, the minimum encoding section setting means sets an end position of the minimum encoding section of the editing processing unit as a picture immediately before an I picture belonging to a GOP including an end frame of the editing effect with a last end time within the editing processing unit.

Furthermore, preferably, the minimum encoding section setting means sets an end position of the minimum encoding section of the editing processing unit as an end position of a GOP including an end frame of the editing effect with a last end time within the editing processing unit.

Furthermore, preferably, the minimum encoding section setting means sets an end position of the minimum encoding section of the editing processing unit as a picture immediately before an I picture belonging to a next GOP of a GOP including an end frame of the editing effect with a last end time within the editing processing unit.

Furthermore, preferably, the minimum encoding section setting means sets an end position of the minimum encoding section of the editing processing unit as an end position of a next GOP of a GOP including an end frame of the editing effect with a last end time within the editing processing unit.

In addition, according to another embodiment of the present invention, an editing method of an editing apparatus that executes editing processing with an encoded stream as an edit material includes the steps of: receiving an operation input for designating the edit material used for editing, an editing effect, and start and end timing of the editing effect; setting an editing processing unit, which is a section in which decoding and encoding are to be performed, of the edit material on the basis of the edit material and the editing effect such that the editing effect at least a part of which until the editing effect ends after starting of the editing effect overlaps is included in one editing processing unit; setting a minimum encoding section that is a minimum encoding section required for encoding the set editing processing unit; and creating a part of an after-editing encoded stream by decoding the edit material, giving the editing effect included in the editing processing unit, and performing encoding on the basis of setting of the minimum encoding section of the editing processing unit.

In addition, according to still another embodiment of the present invention, a program that causes a computer to execute editing processing with an encoded stream as an edit material causes the computer to execute: receiving an operation input for designating the edit material used for editing, an editing effect, and start and end timing of the editing effect; setting an editing processing unit, which is a section in which decoding and encoding are to be performed, of the edit material on the basis of the edit material and the editing effect such that the editing effect at least a part of which until the editing effect ends after starting of the editing effect overlaps is included in one editing processing unit; setting a minimum encoding section that is a minimum encoding section required for encoding the set editing processing unit; and creating a part of an after-editing encoded stream by decoding the edit material, giving the editing effect included in the editing processing unit, and performing encoding on the basis of setting of the minimum encoding section of the editing processing unit.

According to the embodiments of the present invention, an operation for designating an edit material used for editing, an editing effect, and start and end timing of the editing effect is input, an editing processing unit, which is a section in which decoding and encoding are to be performed, of the edit material is set on the basis of the edit material and the editing effect such that the editing effect at least a part of which until the editing effect ends after starting of the editing effect overlaps is included in one editing processing unit, a minimum encoding section that is a minimum encoding section required for encoding the set editing processing unit is set, and a part of an after-editing encoded stream is created by decoding the edit material, giving the editing effect included in the editing processing unit, and performing encoding on the basis of setting of the minimum encoding section of the editing processing unit.

A network means a structure in which at least two apparatuses are connected to each other and information can be transmitted from one apparatus to the other apparatus. An apparatus communicating through a network may be an independent apparatus or an internal block provided in an apparatus.

In addition, the communication may be a radio communication and a wire communication or may be a communication in which a radio communication and a wire communication are mixed, that is, the radio communication is performed in a certain section and the wire communication is performed in the other section. In addition, it is also possible that a communication from an apparatus to another apparatus is the wire communication and a communication from another apparatus to the apparatus is the radio communication.

The editing apparatus may be an independent apparatus or may be a block, which performs editing processing, of an information processing apparatus.

As described above, according to the embodiments of the present invention, it is possible to perform editing processing using the encoded stream as a material and in particular, to reduce a range where deterioration of an image caused by omission of generation occurs.

BRIEF DESCRIPTION OF THE DRAWINGS

FIG. 25 is a view explaining an edit information table;
FIG. 26 is a view explaining an edit information table;
FIG. 27 is a view explaining an edit information table;
FIG. 28 is a view explaining an edit information table;
FIG. 29 is a view explaining an edit information table;
FIG. 30 is a view explaining an edit information table.

DESCRIPTION OF THE PREFERRED EMBODIMENTS

Figure 1:
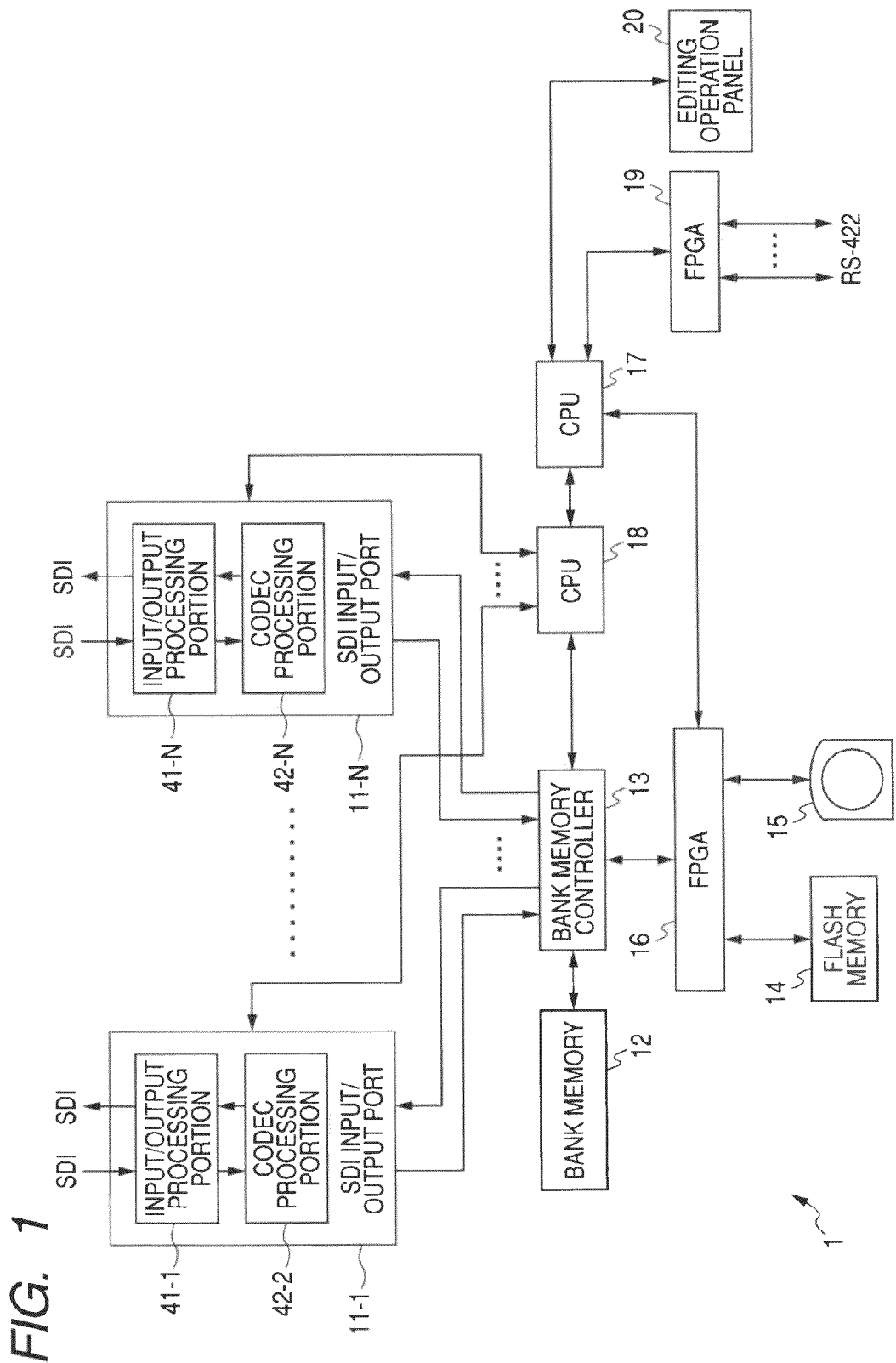
FIG. 1 is a block diagram illustrating the configuration of an image processing apparatus to which the present invention is applied.

FIG. 1 is a block diagram illustrating the configuration of an image processing apparatus 1 to which the present invention is applied.

The image processing system 1 is configured to include 'N' SDI input/output ports 11-1 to 11-N, a bank memory 12, a bank memory controller 13, a flash memory 14, an optical disk drive 15, an FPGA (field programmable gate array) 16, a CPU 17 and a CPU 18, and an FPGA 19, and an editing operation panel 20.

The SDI input/output ports 11-1 to 11-N are a plurality of SDI input/output ports for inputting/outputting a baseband signal based on SDI standards and include input/output processing portions 41-1 to 41-N and CODEC processing portions 42-1 to 42-N, respectively. An example of the configuration of the input/output processing portion 41-1 to 41-N and the CODEC processing portion 42-1 to 42-N will be described in detail later with reference to FIG. 3.

In the following description, the SDI input/output ports 11-1 to 11-N are simply referred to as an SDI input/output port 11 if the SDI input/output ports 11-1 to 11-N do not need to be distinguished from each other, the input/output processing portions 41-1 to 41-N are simply referred to as an input/output processing portion 41 if the input/output processing portions 41-1 to 41-N do not need to be distinguished from each other, and the CODEC processing portions 42-1 to 42-N are simply referred to as a CODEC processing portion 42 if the CODEC processing portions 42-1 to 42-N do not need to be distinguished from each other.

The bank memory 12 is a memory for temporarily recording AV data supplied to the SDI input/output port 11 or AV data supplied from the SDI input/output port 11.

The bank memory controller 13 is a controller that controls recording and reading of AV data into the bank memory 12 and transmission and reception of data between the SDI input/output port 11 and the FPGA 16.

The flash memory 14 is a large-capacity flash memory, which is a main storage of the image processing system 1, and can store encoded streams used as an edit material and a bridge clip, which forms a part of the encoded streams after editing and will be described. In addition, instead of the flash memory 14, a hard disk drive may also be used as the main storage.

The optical disk drive 15 is a drive which controls transmission/reception of data to/from an optical disk when the optical disk that is detachable is mounted. The optical disk drive 15 can read encoded streams, which are recorded in the optical disk mounted and are used as an edit material, or can record a bridge clip, which forms a part of the encoded streams after editing and will be described, in an optical disk.

In addition, it is preferable that the encoded streams used as an edit material and the GOP structure of the encoded streams used as the edit material or information on VBVoccupancy of each frame be recorded in the flash memory 14 or an optical disk mounted in the optical disk drive 15. In addition, when the GOP structure of the encoded streams used as the edit material or information on VBVoccupancy of each frame is not recorded in the flash memory 14 or the optical disk mounted in the optical disk drive 15, it is preferable to analyze each of the encoded streams, to obtain the GOP structure of the encoded streams used as the edit material or the information on VBVoccupancy of each frame, and to record the obtained GOP structure or information together with the encoded streams by the control of the CPU 17.

The FPGA 16 is a programmable LSI (large scale integration) provided with a low-function processor and controls the flash memory 14 and the optical disk drive 15.

The CPU 17 controls the FPGA 16, the CPU 18, and the FPGA 19 on the basis of an operation input that an operator inputs using the editing operation panel 20. The CPU 17 has a file system, which is used for managing data recorded in the flash memory 14 and the optical disk mounted in optical disk drive 15, or a file manager, which is a high-order program of the file systems and makes an overall control of processing of the entire image processing system 1.

The CPU 18 controls the SDI input/output port 11 and the bank memory controller 13 on the basis of control of the CPU 17.

The FPGA 19 is a programmable LSI provided with a low-function processor and controls transmission/reception of a command or status to/from using an RS-422 protocol. Specifically, the FPGA 19 analyzes a command, which is received from the outside on the basis of the RS-422 protocol and instructs an operation, such as recording or reproduction, to each SDI input/output port 11, and then supplies the result to the CPU 17 or converts the status from the CPU 17 into the RS-422 protocol and returns the result to the outside.

The editing operation panel 20 includes input devices, such as a key, a button, a mouse, and a touch panel, and receives an operation input regarding editing processing from an operator. In addition, the editing operation panel 20 also includes a display portion for displaying a GUI (graphical user interface) that helps an operator make an operation input for performing editing processing. A timeline to be described later is displayed on the display portion.

Next, an operation of the image processing apparatus 1 will be described.

An encoded stream prepared as an edit material is recorded in the flash memory 14 or the optical disk mounted in the optical disk drive 15.

The CPU 17 acquires information regarding the encoded streams recorded in the flash memory 14 or the optical disk mounted in the optical disk drive 15, selects the encoded streams as the edit material, splices the encoded streams at a predetermined point, creates a GUI that the operator refers in order to make an instruction for giving a predetermined editing effect to a required portion, and makes the GUI displayed on the display portion of the editing operation panel 20.

On the basis of the GUI displayed on the display portion of the editing operation panel 20, the operator selects an edit material from the encoded streams recorded in the flash memory 14 or the optical disk mounted in the optical disk drive 15 and then splices the encoded streams at a predetermined position or performs an operation input for giving an editing effect, such as an effect or superimposition of data, at a desired position.

Figure 2:
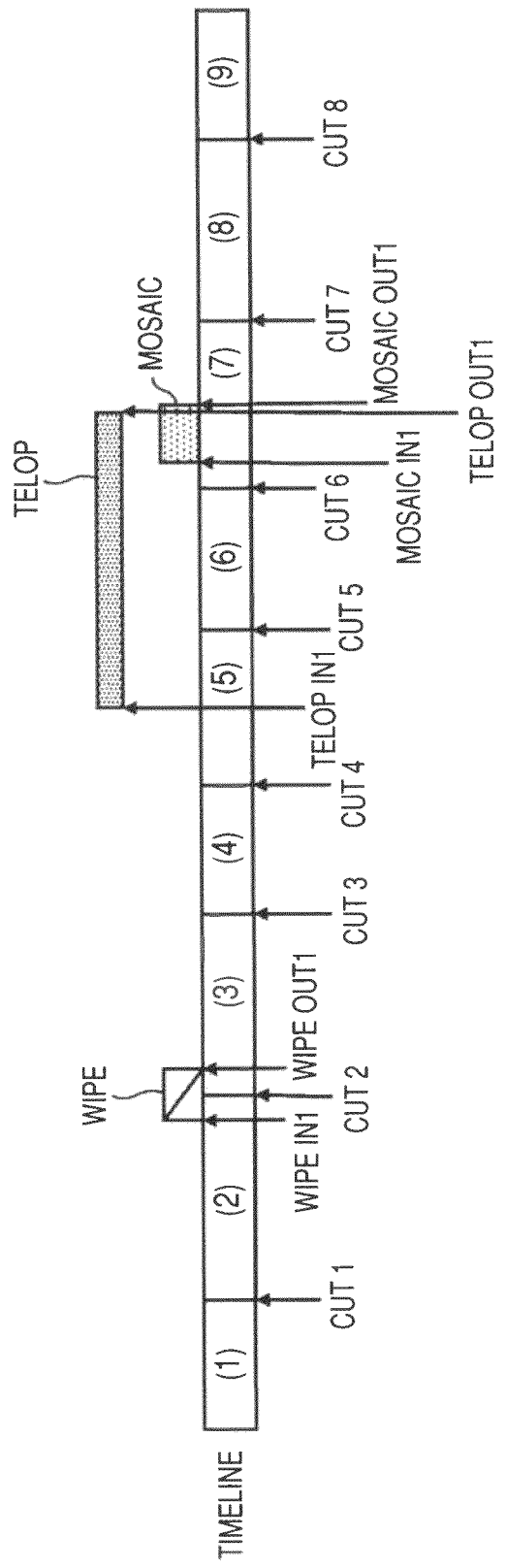
FIG. 2 is a view explaining a timeline.

FIG. 2 illustrates an example of a timeline which is a GUI displayed on a display portion of the editing operation panel 20.

In the timeline, the arrangement of streams after editing and details of the editing effect are displayed as a figure in a time sequential manner.

When editing processing designated by the timeline shown in FIG. 2 is executed, an encoded stream (1) and an encoded stream (2) are spliced at time indicated as a cut 1, the encoded stream (2) and an encoded stream (3) are spliced at time indicated as a cut 2, wipe which is one of the basic effects that splices cuts between a time indicated as wipe IN1 and a time indicated as wipe IN2 so as to include the cut 2 and by which a previous cut is wiped and a new cut appears is executed. Then, the encoded stream (3) and an encoded stream (4) are spliced at a time indicated as a cut 3, the encoded stream (4) and an encoded stream (5) are spliced at a time indicated as a cut 4, the encoded stream (5) and an encoded stream (6) are spliced at a time indicated as a cut 5, the encoded stream (6) and an encoded stream (7) are spliced at a time indicated as a cut 6, a telop is inserted in a period from a time indicated as a telop IN1 to a time indicated as a telop OUT1 so as to include the cut 5 and the cut 6, and mosaic processing is performed from a time indicated as a mosaic IN1 to a time indicated as a mosaic OUT1 with the time of the telop OUT1 interposed therebetween. Then, the encoded stream (7) and an encoded stream (8) are spliced at a time indicated as a cut 7, and the encoded stream (8) and an encoded stream (9) are spliced at a time indicated as a cut 8.

As for materials disposed on the timeline, elements operated on the materials on the timeline including, for example, a cut point, effects such as wipe, telop, mosaic, and overlapping of picture in picture are referred to as overlapping elements. In addition, the material and overlapping elements are referred to as edit elements. Start time and end time necessarily exist in an overlapping element. A cut point is considered to be an overlapping element in which start time and end time coincide. The start time of an overlapping element is a time code of a material on which the overlapping element starts to operate, and the end time of the overlapping element is a next time code of the material on which the overlapping element completes operating. The overlapping element will be described later with reference to FIGS. 5 to 15.

A portion corresponding to the overlapping element on the timeline and a predetermined range before and after the portion need to be encoded after decoding an edit material for the purpose of editing. For example, in the case when a range where an edit material is decoded and encoded is determined in the order of start time of overlapping elements and decoding and encoding processing are performed sequentially for every overlapping element, decoding and encoding are made to be performed a plural number of times on the same portion, for example, in portions of the telop 1, mosaic 1, cut 5, and cut 6 shown in FIG. 2. As a result, omission of generation in these portions largely occurs, deteriorating an image.

Therefore, overlapping elements that overlap on the timeline are considered as an edit element block, that is, a group.

That is, in the case where the start time of an overlapping element B different from an overlapping element A, which is later than a start time of the overlapping element A, is earlier than the end time of the overlapping element A on the timeline, the overlapping elements A and B are considered as one edit element block. In addition, when different overlapping elements C, D, . . . of which the start time is earlier than the end time of the edit element block further exist, these overlapping elements C, D, . . . are also considered as one edit element block. In addition, the edit element block includes all edit elements included in a period from the start time of an overlapping element among overlapping elements included, which has the earliest start time, to the end time of an overlapping element having the latest end time.

In addition, the range where decoding and encoding for editing are performed is set on the basis of the edit element block. A minimum re-encoding section, which is required for every edit element block in order to acquire a compressed motion picture signal as an edit result regarding the edit element block, is referred to as a minimum encoding section. The minimum encoding section is set on the basis of the relationship between the position of a GOP break of a material forming the minimum encoding section and the position of a GOP break forming edit element blocks before and after the minimum encoding section. The minimum encoding section will be described in detail later with reference to FIGS. 17 to 24.

That is, the CPU 17 recognizes an edit material and the overlapping elements on the timeline on the basis of an operator's operation input supplied from the editing operation panel 20, sets an edit element block, and then sets a minimum encoding section on the basis of the edit element block.

In addition, the CPU 17 instructs the CPU 18 to control editing processing including CODEC processing of the minimum encoding section.

The CPU 18 controls the bank memory controller 13 to thereby supply the edit material included in the minimum encoding section to the SDI input/output port 11 and control editing processing including CODEC processing of the minimum encoding section using the SDI input/output port 11.

In the CODEC processing portion 42 of the SDI input/output port 11 of the image processing system 1, only a portion required for encoding of the minimum encoding section is decoded and then processing based on overlapping elements are performed in each edit element block on the timeline, and non-compressed video signals on which the processing based on overlapping elements is performed are encoded such that VBVoccupancy is seamless at a splicing point with a portion that is not decoded. The portion on which the decoding and encoding are performed is referred to as a bridge clip.

Encoded streams after editing are created by splicing a portion of the bridge clip, which is recorded in the flash memory 14 or the optical disk mounted in the optical disk drive 15 and on which decoding and encoding have been performed, and an edit material stream, which is recorded beforehand and is not decoded, by the control of the CPU 17.

Furthermore, in the CODEC processing portion 42, encoding of the minimum encoding section should be executed such that VBVoccupancy is seamless in a portion obtained by splicing a bridge clip end point to a portion where decoding and encoding are not performed. That is, target VBVoccupancy in encoding of the minimum encoding section becomes VBVoccupancy of a frame spliced to the bridge clip end point. The CPU 17 acquires information regarding encoded streams recorded in the flash memory 14 or the optical disk mounted in the optical disk drive 15 and extends a range of a bridge clip as needed so as to match the target VBVoccupancy or instructs the CPU 18 to control editing processing including the CODEC processing of the minimum encoding section such that two pass encoding for executing encoding in a bridge clip again is executed.

Since the CPU 17 acquires, as information on encoded streams recorded in the flash memory 14 or the optical disk mounted in the optical disk drive 15, information of VBVoccupancy of each frame of the encoded stream, a value of VBVoccupancy of the frame spliced to the bridge clip end point can be set as the target VBVoccupancy in the CODEC processing portion 42.

Moreover, information that serves to make an operator recognize the edit element block, the minimum encoding section, and the like and to help the operator execute an operation input may be further displayed on the display portion of the editing operation panel 20, in addition to the timeline described by using FIG. 2. An example of display of such information will be described with reference to FIGS. 33 to 36.

Figure 3:
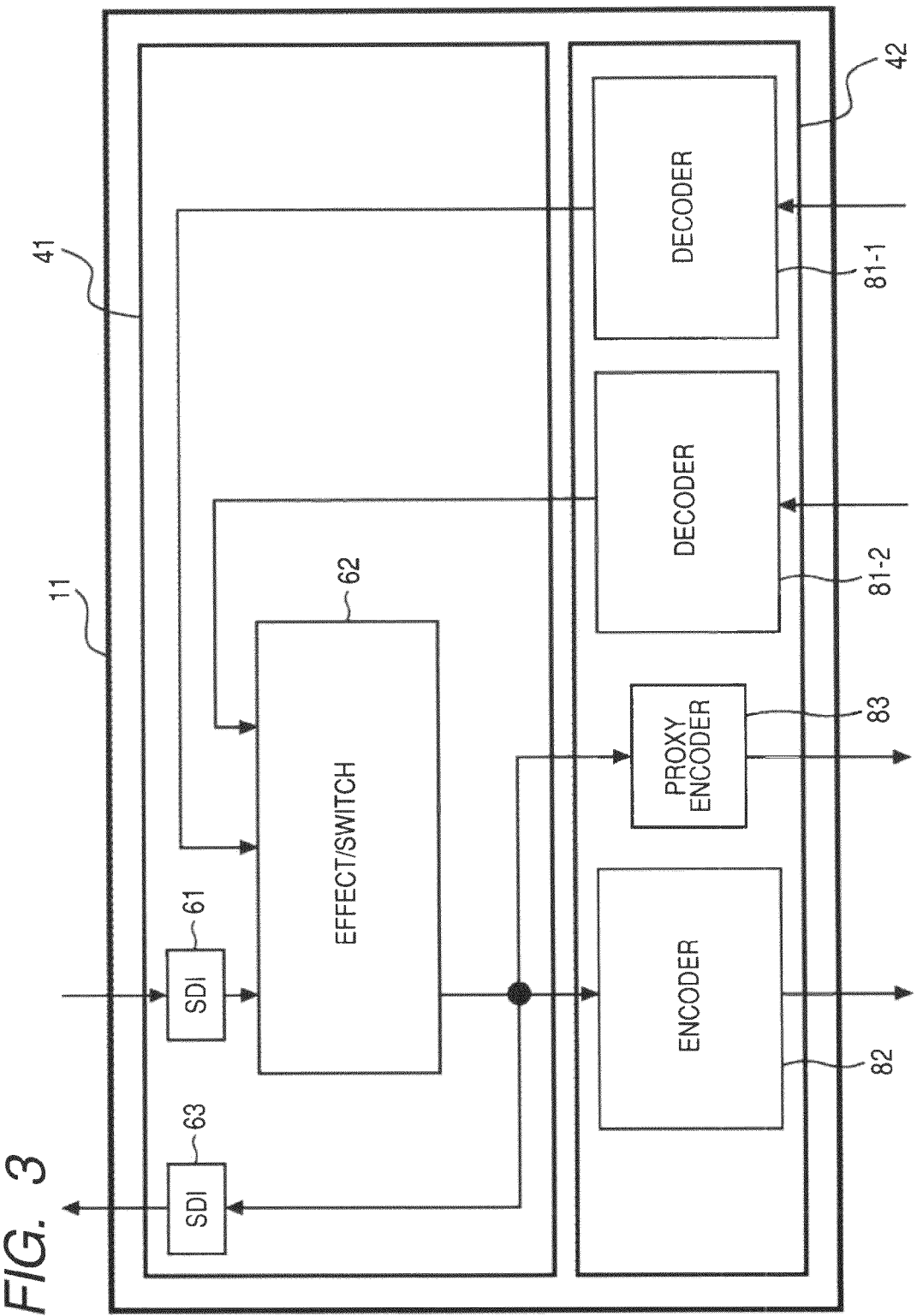
FIG. 3 is a block diagram illustrating the configuration of an SDI input/output port shown in FIG. 1.

Next, FIG. 3 is a block diagram illustrating the configuration of the SDI input/output port 11 in more detail.

The input/output processing portion 41 is configured to include an SDI input portion 61, an effect/switch 62, and an SDI output portion 63, and the CODEC processing portion 42 is configured to include decoders 81-1 and 81-2, an encoder 82, and a proxy encoder 83.

The decoders 81-1 and 81-2 are supplied with a portion, which is required for creation of a bridge clip, among encoded streams which are edit materials, and decode the received portion. A non-compressed video signal corresponding to the decoded edit material is supplied to the effect/switch 62.

The effect/switch 62 is supplied with the non-compressed video signal from the decoders 81-1 and 81-2 and changes an output of the supplied non-compressed video signal on the basis of control of the CPU 18. That is, the effect/switch 62 performs cut point processing for coupling the supplied non-compressed video signals in a predetermined frame. In addition, the effect/switch 62 performs the effect, such as wipe or mosaic, in a predetermined range as needed or performs processing for overlapping images corresponding to telop, picture in picture, and the like supplied from the SDI input portion 61. The effect/switch 62 causes the non-compressed video signals, which include the overlapping elements created, to be output from the SDI output portion 63 and to be then displayed as a preview or supplies the non-compressed video signals to the encoder 82 or the proxy encoder 83.

The encoder 82 encodes the supplied non-compressed video signal on the basis of control of the CPU 18 and thereby creates a bridge clip. As described above, the encoder 82 executes encoding processing in a portion, which is obtained by splicing a bridge clip end point to a portion where decoding and encoding are not performed, such that VBVoccupancy is seamless on the basis of control of the CPU 18. In addition, in the case where VBVoccupancy is not seamless at the end of encoding, the encoder 82 may extend a range of a bridge clip as needed and execute two pass encoding for executing encoding in a bridge clip again.

The proxy encoder 83 reduces the amount of data for easy communication, even though the image quality is decreased, by extremely reducing the code amount of image data, which has the same picture as a stream encoded and created by the encoder 82 or creates proxy video data of the portion of the bridge clip by encoding the non-compressed video signal supplied to create a proxy image stream that is a motion picture data used as data at the time of preview or high-speed reproduction. Encoding of proxy data performed by the proxy encoder 83 will be described in detail later.

In this manner, one SDI input/output port 11 can create one bridge clip. In other words, a plurality of bridge clips may be created together by the plurality of SDI input/output ports 11.

Figure 4:
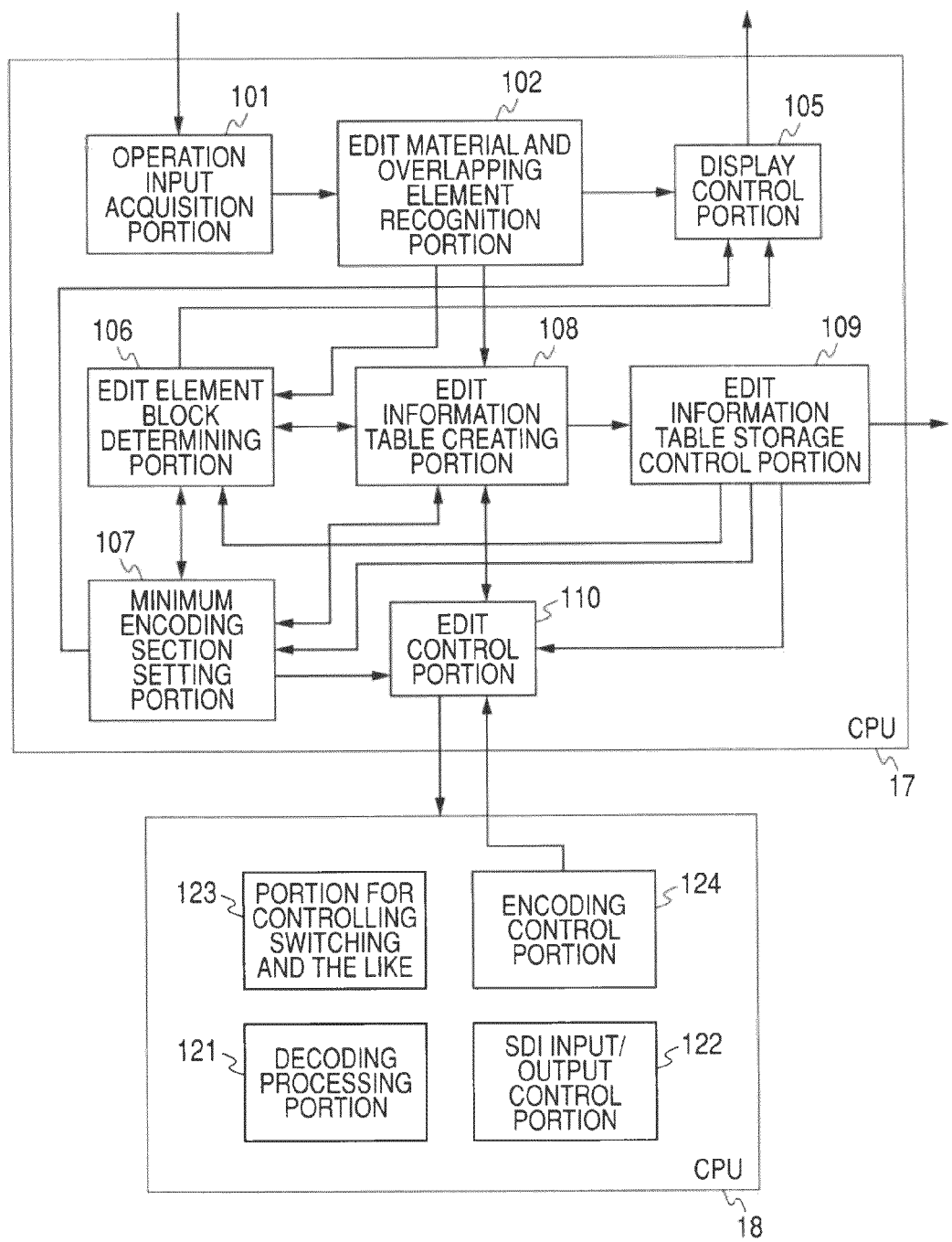
FIG. 4 is a functional block diagram explaining functions of CPUs 17 and 18 shown in FIG. 1.

Next, FIG. 4 is a functional block diagram for explaining functions of the CPUs 17 and 18.

The CPU 17 is configured to include an operation input acquisition portion 101, an edit material and overlapping element recognition portion 102, a display control portion 105, an edit element block determining portion 106, a minimum encoding section setting portion 107, an edit information table creating portion 108, an edit information table storage control portion 109, and an edit control portion 110. In addition, the CPU 18 is configured to include a decoding processing portion 121, an SDI input/output control portion 122, a portion 123 for controlling switching and the like, and an encoding control portion 124.

The operation input acquisition portion 101 acquires an operation input that an operator inputs using the editing operation panel 20 and supplies the acquired operation input to the edit material and overlapping element recognition portion 102.

The edit material and overlapping element recognition portion 102 recognizes the edit material and overlapping elements instructed for editing on the basis of the operator's operation input supplied from the operation input acquisition portion 101 and supplies the recognized edit material and overlapping elements to the display control portion 105, the edit element block determining portion 106, and the edit information table creating portion 108.

The display control portion 105 displays the timeline, which has been described with reference to FIG. 2, on the display portion of the editing operation panel 20 on the basis of information on the edit material and overlapping elements in editing supplied from the edit material and overlapping element recognition portion 102. In addition, the display control portion 105 may further display information, which serves to make an operator recognize the edit element block, the minimum encoding section, and the like and to help the operator execute an operation input, on the display portion of the editing operation panel 20, in addition to the timeline.

The edit element block determining portion 106 determines the above-described edit element block on the basis of the information on the edit material and overlapping elements in editing supplied from the edit material and overlapping element recognition portion 102 and supplies the edit elements included in the edit element block and information on the edit elements to the edit information table creating portion 108 and the minimum encoding section setting portion 107. In the case when a part of edit elements on the timeline is changed, the edit element block determining portion 106 can set only the edit element block, which is to be changed according to the above change, on the basis of a past edit information table stored in the edit information table storage control portion 109. In addition, in the case when the determined or changed edit element block is made to be displayed together with the timeline, the edit element block determining portion 106 supplies to the display control portion 105 edit elements included in the edit element block and information on the edit elements.

The minimum encoding section setting portion 107 sets a minimum encoding section on the basis of the edit elements included in the edit element block and the information on the edit elements, which are supplied from the edit element block determining portion 106. Setting of the minimum encoding section will be described later with reference to FIGS. 17 to 24. The minimum encoding section setting portion 107 supplies to the edit control portion 110 the determined minimum encoding section and information required for control of encoding of a GOP structure, a value of the target VBVoccupancy, and the like. In addition, in the case when a part of edit elements on the timeline is changed, the minimum encoding section setting portion 107 can set only the minimum encoding section, which is to be changed according to the above change, on the basis of the past edit information table stored in the edit information table storage control portion 109. In addition, in the case when the determined or changed minimum encoding section is made to be displayed together with the timeline, the minimum encoding section setting portion 107 supplies information on the minimum encoding section to the display control portion 105.

The edit information table creating portion 108 creates an edit information table where the edit elements included in the edit element block and the information on the edit elements, which have been determined by the edit element block determining portion 106, and the minimum encoding section set by the minimum encoding section setting portion 107 are described and supplies the edit information table to the edit information table storage control portion 109 so as to be stored. The edit information table will be described in detail later with reference to FIGS. 25 to 30.

In the case when some edit elements are changed on the same timeline, a new edit information table is created together with information on the minimum encoding section or the edit element block changed according to the above change. In addition, an edit information table before the change remains in the edit information table storage control portion 109 until an editing operation using the timeline is completely ended or the operator expressly instructs elimination thereof. Accordingly, for setting of a minimum encoding section or an edit element block corresponding to a portion, which is not changed according to the change of edit elements, it is possible to refer to the edit information table before change remaining in the edit information table storage control portion 109. In addition, also in the case where some edit elements are changed on the same timeline and then return to the original state again, it is not necessary to create the edit information table again, which is suitable.

The edit information table storage control portion 109 stores an edit information table created by the edit information table creating portion 108.

On the basis of the edit information table created by the edit information table creating portion 108, the edit control portion 110 creates a command for control of editing processing executed in the SDI input/output port 11 by the CPU 18 and issues the created command to the CPU 18, and issues to the CPU 18 the determined minimum encoding section and information required for control of encoding of a GOP structure of edit material, a value of the target VBVoccupancy, and the like, which are supplied from the minimum encoding section setting portion 107. In addition, when the edit control portion 110 is notified from the encoding control portion 124 of the CPU 18 that encoding could not be completed such that VBVoccupancy is seamless at an encoding end point in connection with setting of the current encoding section, the edit control portion 110 creates a command for extending a range of a bridge clip or executing two pass encoding for executing encoding in the bridge clip again and then issues the created command to the CPU 18.

The decoding processing portion 121 controls decoding processing of encoded streams, which are edit materials in the decoders 81-1 and 81-2 of the SDI input/output port 11, on the basis of the command issued from the edit control portion 110.

The SDI Input/output control portion 122 controls input of the SDI signal from the SDI input portion 61 and output of the SDI signal from the SDI output portion 63 on the basis of the command issued from the edit control portion 110.

The portion 123 for controlling switching and the like controls switching of the output of a non-compressed video signal using the effect/switch 62, that is, processing of a cut point on the basis of the command issued from the edit control portion 110 and also controls effect processing, such as wipe or mosaic, in a predetermined range and processing for overlapping images corresponding to the telop or the picture in picture.

The encoding control portion 124 controls the encoding processing perform by the encoder 82 and the proxy encoder 83 on the basis of the command issued from the edit control portion 110.

Next, an overlapping element will be described with reference to FIGS. 5 to 15.

A simple cut point will be described with reference to FIGS. 5 and 6.

Figure 5:
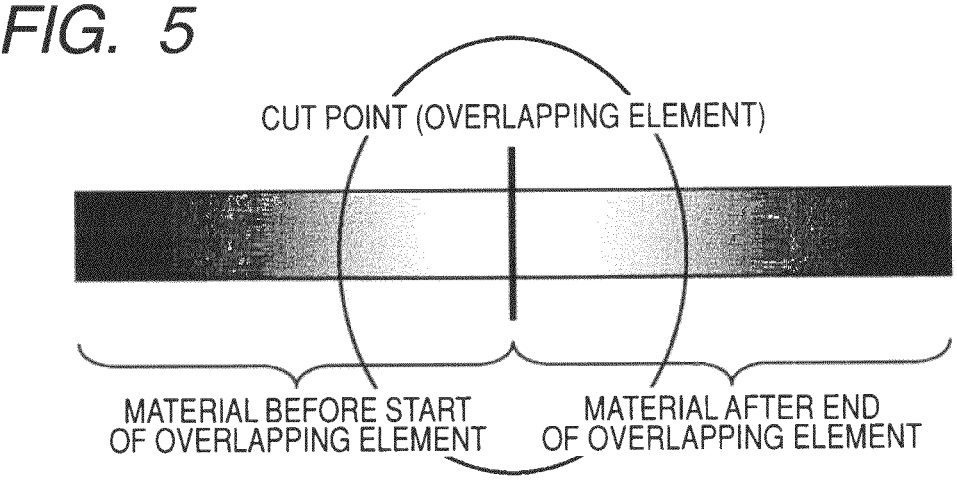
FIG. 5 is a view explaining an overlapping element.

A simple cut point (hereinafter, referred to as a 'cut point') which is an overlapping element shown in FIG. 5 is a point that splices a material immediately before the start of a cut point to a material immediately after the end of a cut point.

Figure 6:
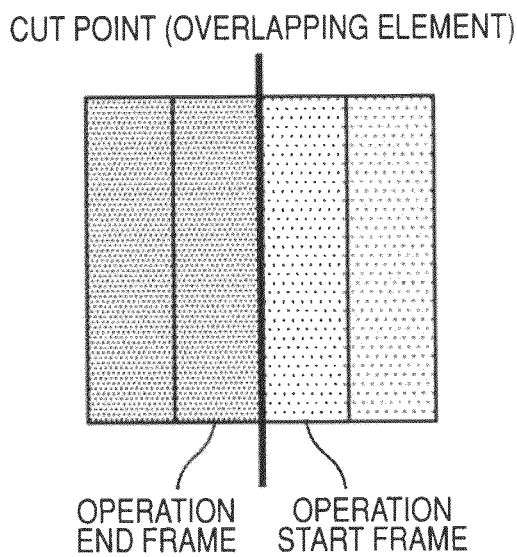
FIG. 6 is a view explaining an overlapping element.

As shown in FIG. 6, a frame immediately before a cut point is a frame in which an operation of the cut point as an overlapping element ends, and the next frame becomes the end time of the overlapping element. In addition, a frame immediately after a cut point is a frame in which an operation of the cut point as an overlapping element starts, and this frame becomes the start time. That is, the start time of a cut point is also the end time of a cut point.

Next, the simple effect will be described with reference to FIGS. 7 and 8.

Figure 7:
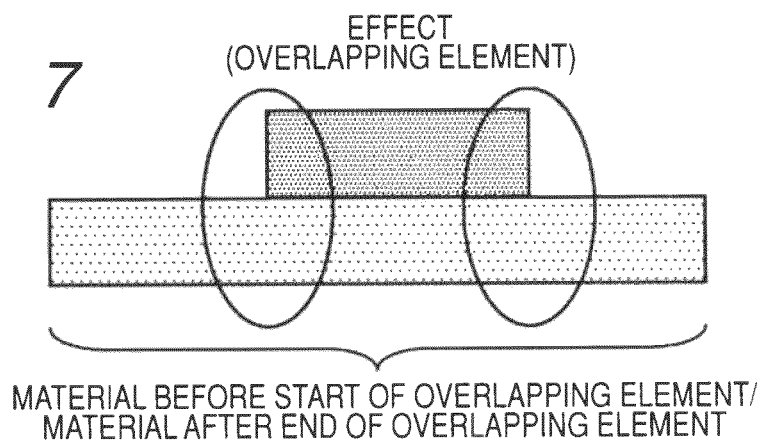
FIG. 7 is a view explaining an overlapping element.

Here, in the case of classification as the 'simple effect' other overlapping elements, such as cut points, do not exist in a period from the start of the effect to the end of the effect as shown in FIG. 7. Accordingly, since the simple effect as an overlapping element is performed on only one material, a material before the start of an overlapping element and a material after the end of an overlapping element are the same material.

Figure 8:
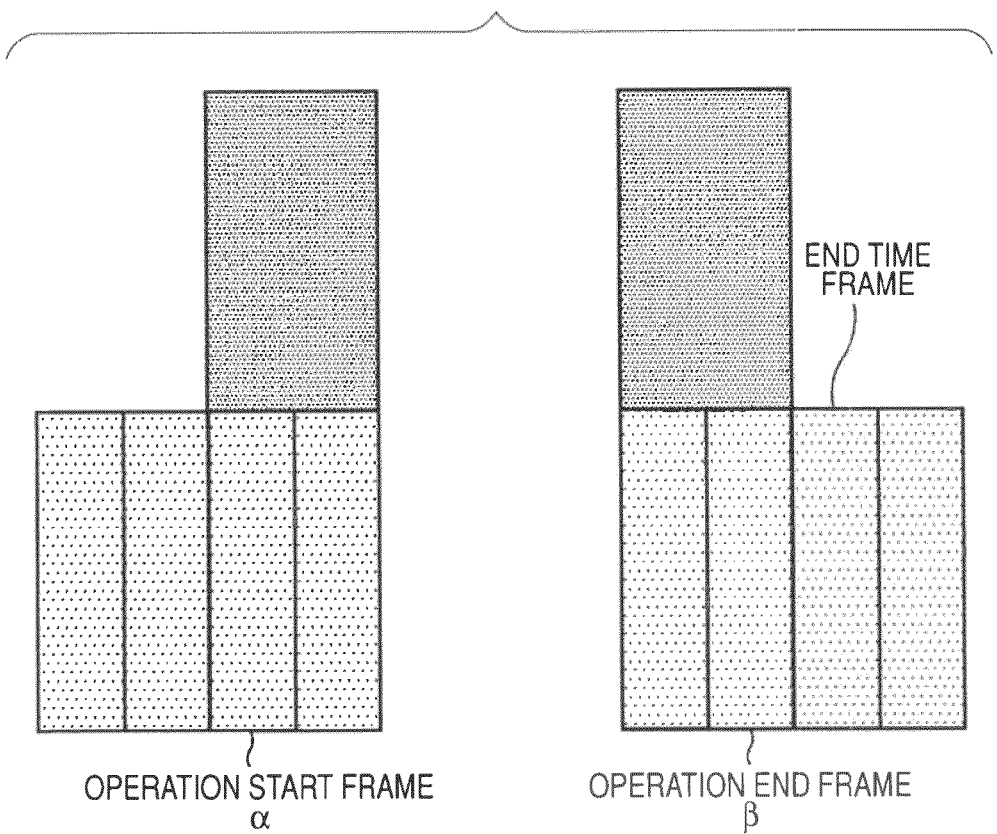
FIG. 8 is a view explaining an overlapping element.

FIG. 8 illustrates the relationship between an effect and a frame near a start point and an end point of the simple effect shown in FIG. 7 (portions indicated by circle marks in FIG. 7). A frame indicated by α is a frame near the simple effect start point, and a frame in which the effect as an overlapping element starts is shown. In addition, a frame indicated by β is a frame near the simple effect end point, a frame in which the effect as an overlapping element ends is shown, and the next frame becomes the end time frame of the overlapping element.

Next, the overlapping effect will be described with reference to FIGS. 9 to 12.

Figure 9:
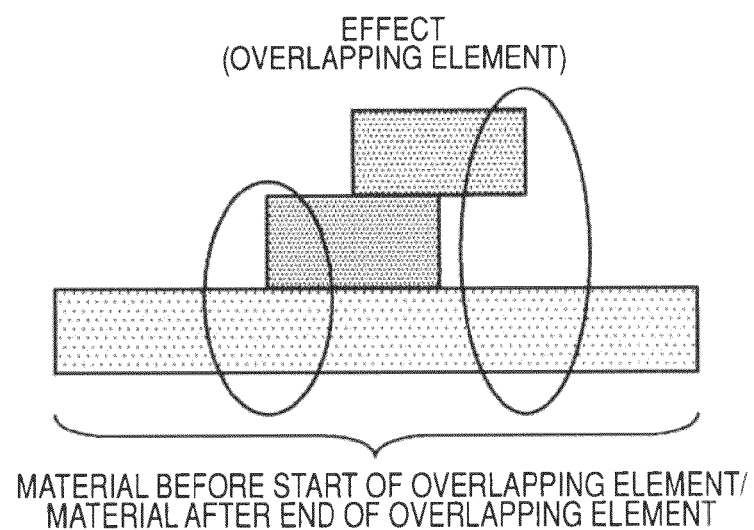
FIG. 9 is a view explaining an overlapping element.

As shown in FIG. 9, the overlapping effect is an edit element that effects overlap in a section not including a cut point.

In this case, overlapping elements that overlap each other are considered as one group in a condition where a time, at which an operation of the first overlapping element starts, is set to a start time and a time, at which an operation of the last overlapping element ends, is set to an end time. Since it is a section not including a cut point, the overlapping effect as an overlapping element is performed on only one material. Accordingly, a material before the start of an overlapping element and a material after the end of an overlapping element are the same material.

Figure 10:
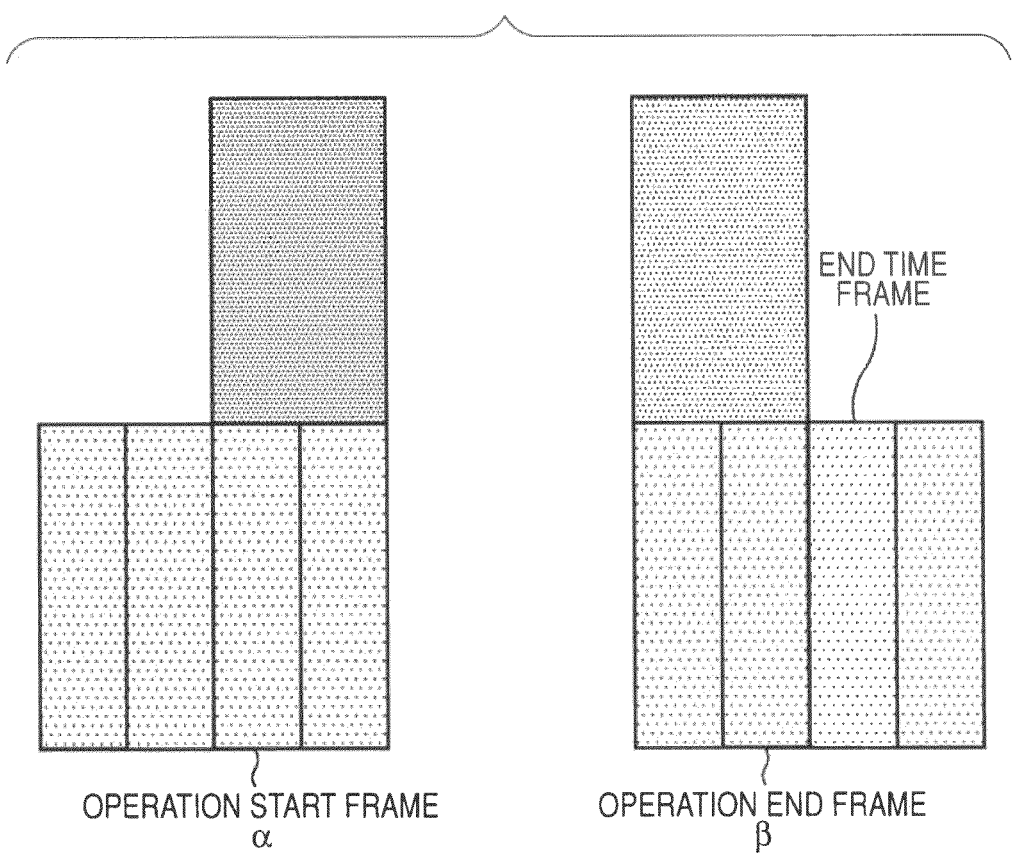
FIG. 10 is a view explaining an overlapping element.

FIG. 10 illustrates the relationship between an effect and a frame near a start point and an end point of the overlapping effect shown in FIG. 9 (portions indicated by circle marks in FIG. 9). A frame indicated by α is a frame near the overlapping effect start point, and a frame in which the effect as an overlapping element starts is shown. In addition, a frame indicated by β is a frame near the overlapping effect end point, a frame in which the effect as an overlapping element ends is shown, and the next frame becomes the end time frame of the overlapping element.

Figure 11:
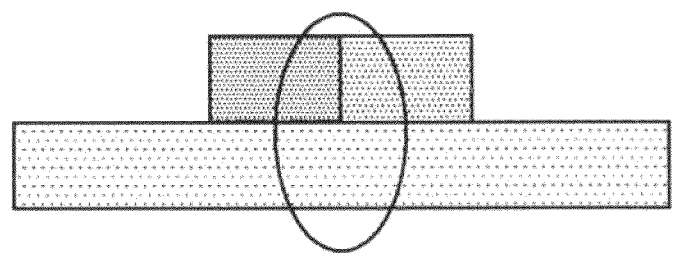
FIG. 11 is a view explaining an overlapping element.

Furthermore, as shown in FIG. 11, a case where the end time of a previous overlapping element and the start time of a next overlapping element are the same time, that is, a case where the overlapping elements do not overlap but are seamless is also treated as the overlapping effect.

Figure 12:
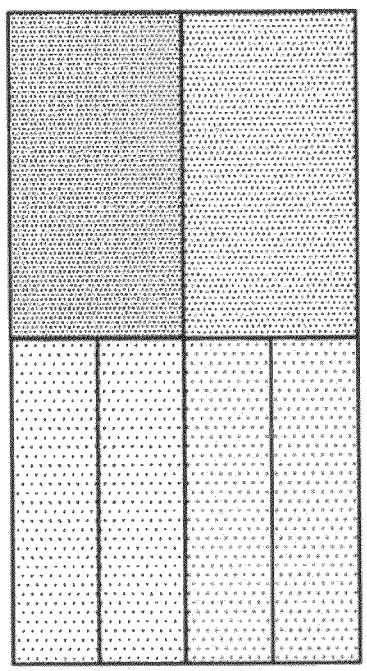
FIG. 12 is a view explaining an overlapping element.

FIG. 12 illustrates the relationship between an effect and a frame of a portion (portion indicated by a circle mark in FIG. 11) where two effects continue in the overlapping effect shown in FIG. 11. As shown in FIG. 12, each of the effects is performed on different frames and there is no relationship between the effects. However, the effects are treated as overlapping effects in the case when the effects are recognized as an edit element block, in the same manner as the cases using FIGS. 9 and 10.

Next, a cut effect will be described with reference to FIGS. 13 to 15.

Figure 13:
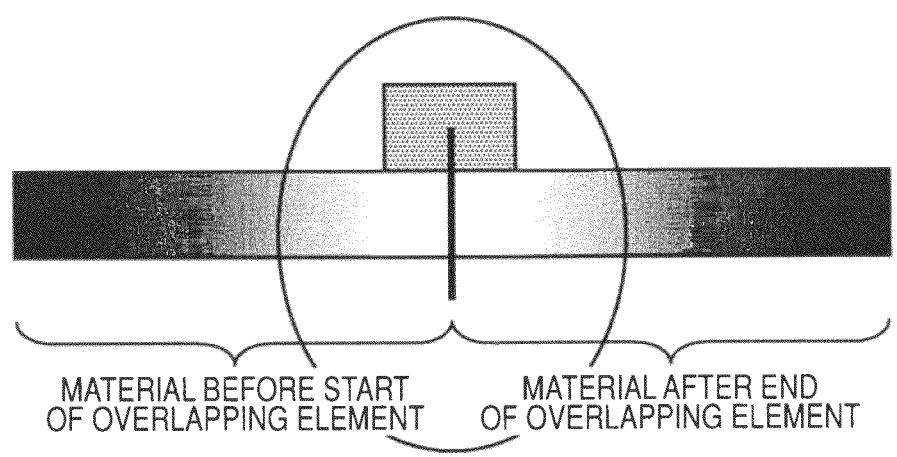
FIG. 13 is a view explaining an overlapping element.

The cut effect is an edit element including a cut point within a time zone from the start time of the effect to the end time, for example, as shown in FIG. 13.

Figure 14:
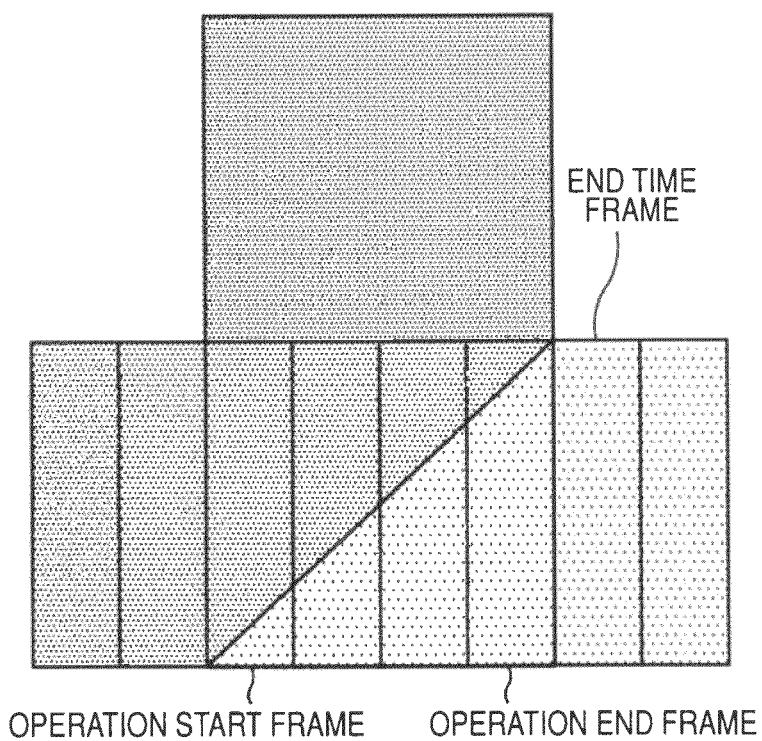
FIG. 14 is a view explaining an overlapping element.

FIG. 14 illustrates the relationship between an effect and a frame of a portion (portion indicated by a circle mark in FIG. 13) where a cut point and an effect overlap in the cut effect shown in FIG. 13. Here, wipe is applied as an effect and a cut after a cut point appears such that a cut before the cut point is wiped. In FIG. 14, a frame in which an operation of the effect as an overlapping element starts is shown, a frame in which an operation of the effect as the overlapping element ends is shown, and the next frame of the frame in which the operation ends becomes an end time frame of the overlapping element.

In addition, effects in the simple effect, the overlapping effect, and the cut effect include not only giving of effects, such as wipe, but also insertion of various kinds of motion picture materials, such as a picture in picture, mosaic, telop, or insertion of a still image.

Figure 15:
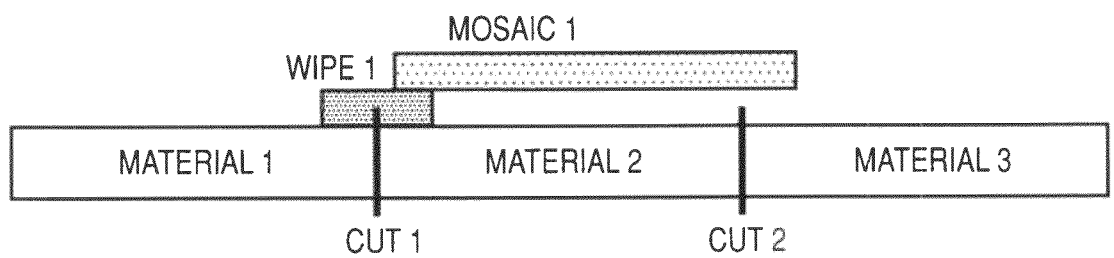
FIG. 15 is a view explaining an overlapping element.

In addition, as shown in FIG. 15, wipe 1 is applied to a cut point 1 which splices a material 1 with a material 2 and a mosaic 1 is started before the end time of the wipe 1. Then, when a cut point 2 which splices the material 2 and a material 3 exists before a mosaic 1 ends, the cut effect is given to the whole portion. Accordingly, constituent elements of the edit element block include all of the wipe 1, the cut point 1, the mosaic 1, the cut point 2, the material 1, the material 2, and the materials 3.

Figure 16:
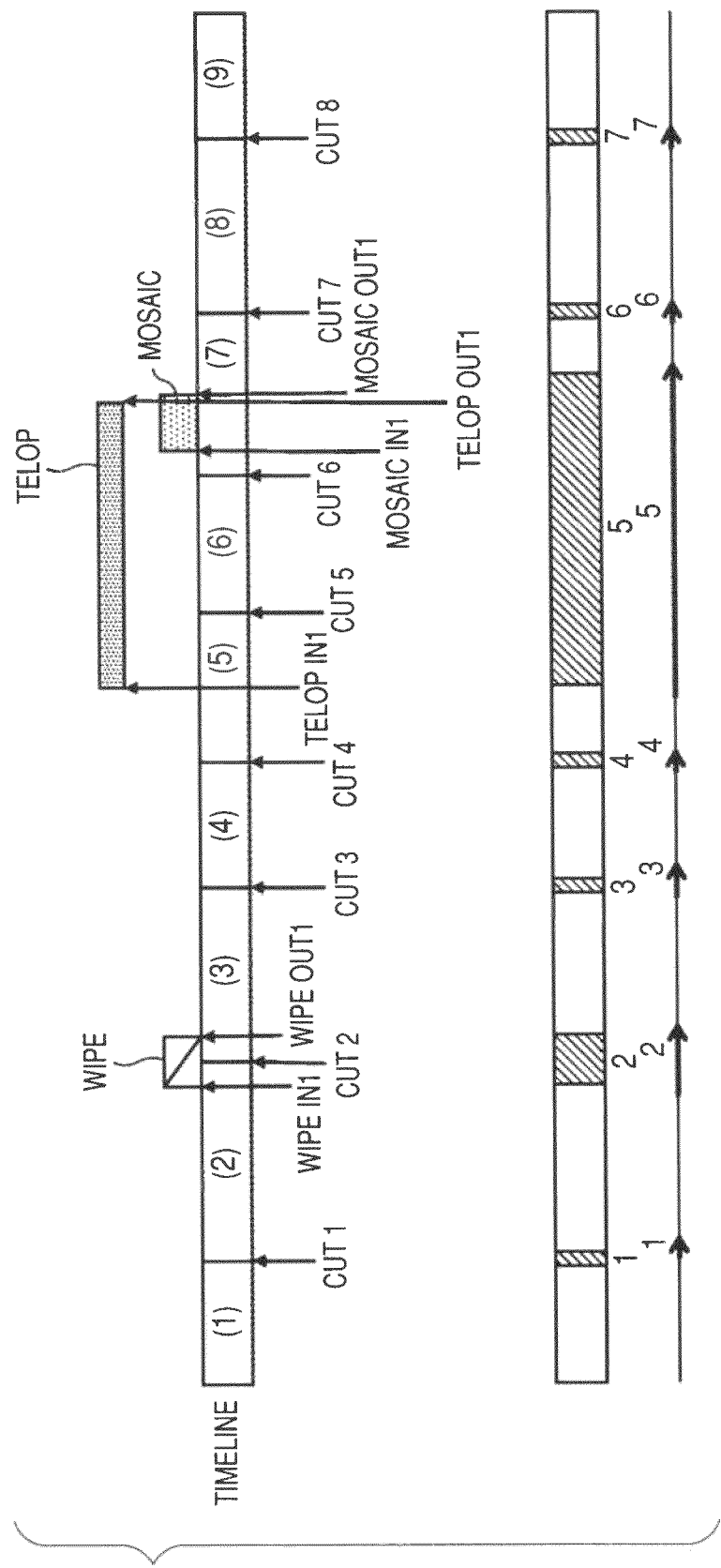
FIG. 16 is a view explaining an edit element block related to the timeline.

Since the edit material and overlapping element recognition portion 102 recognizes the edit elements and the overlapping elements described above and supplies information on the recognized edit elements and overlapping elements to the display control portion 105, the display control portion 105 controls the display of the timeline shown in FIG. 16.

The following edit contents are written on the timeline shown in an upper part of FIG. 16.

That is, ten kinds of edit contents including (i) a screen changes from a material (1) to a material (2) at a point of cut 1, (ii) a wipe operation when the change from the material (2) to a material (3) starts from a point of wipe IN1 and ends at a point of wipe OUT2, (iii) a screen changes from the material (3) to a material (4) at a point of cut 3, (iv) a screen changes from the material (4) to a material (5) at a point of cut 4, (v) telop is inserted in a period from a point of telop IN1 to a point of telop OUT1, (vi) a screen changes from the material (5) to a material (6) at a point of cut 5, (vii) a screen changes from the material (6) to a material (7) at a point of cut 6, (viii) mosaic processing is performed on the screen from a point of mosaic IN1 to a point of mosaic OUT1, (ix) a screen changes from the material (7) to a material (8) at a point of cut 7, and (x) a screen changes from the material (8) to a material (9) at a point of cut 8 are written on the timeline shown in an upper part of FIG. 16 when they are arranged in the order of start time of an overlapping element.

In addition, the edit element block determining portion 106 determines an edit element block according to the overlap condition of overlapping elements. That is, the edit element block determining portion 106 overlaps overlapping elements in the order of early start time and temporarily determines an edit element block from an overlapping element with early start time such that overlapping elements with the same start time belong to the same edit element block. Then, the edit element block determining portion 106 compares the end time of an overlapping element A with the start time of an overlapping element B whose start time is later than the overlapping element A. Then, if the start time of the overlapping element B is earlier than the end time of the overlapping element A, the edit element block determining portion 106 determines that the overlapping element B is included in the edit element block in which the overlapping element A is included. In contrast, if the start time of the overlapping element B is later than the end time of the overlapping element A, the edit element block determining portion 106 determines that the overlapping element B is not included in the edit element block in which the overlapping element A is included.

In this manner, the edit element block determining portion 106 makes a temporary decision of the edit element block, which is shown in a lower part of FIG. 16, with respect to all overlapping elements. Contents of the edit element block that is temporarily decided are reflected in an edit information table created by the edit information table creating portion 108.

In addition, the minimum encoding section setting portion 107 sets a minimum encoding section for the edit element block that is temporarily decided.

Figure 17:
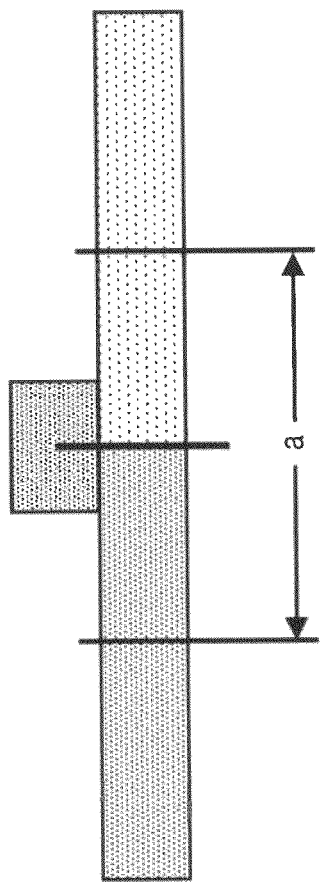
FIG. 17 is a view explaining a minimum encoding section.

The minimum encoding section is set in a range including overlapping elements included in the edit element block. For example, as shown in FIG. 17, for the cut effect, a range shown by 'a' in the drawing which is determined by the phase of a GOP including the start position of the effect and the start position of the effect in an edit material and the phase of a GOP including the end position of the effect and the end position of the effect in the edit material is set as the minimum encoding section.

A start point of the minimum encoding basically serves as a first frame of a GOP including a start frame of an overlapping element.

On the other hand, an end point of the minimum encoding section may be a break of a GOP including an end frame of an overlapping element or may be a picture immediately before I picture immediately after an end frame of an overlapping element.

Figure 18:
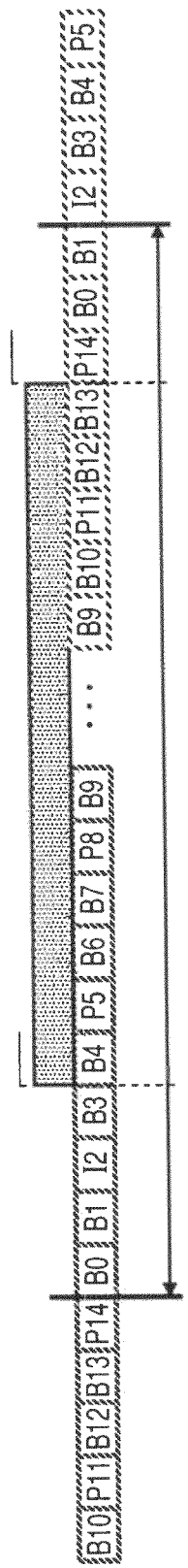
FIG. 18 is a view explaining a minimum encoding section.

The end point of the minimum encoding section is decided by whether or not the reference relation allowing a B picture before an I picture of the GOP to be correctly decoded can be maintained by a B picture before an I picture and P and I pictures before and after the B picture. Basically, as shown in FIG. 18, all portions that receive an influence, in which data becomes different from the contents before decoding by encoding, are encoded by setting the minimum encoding section up to a picture immediately before an I picture (for example, refer to JP-A-2006-67095).

In addition, when a minimum value of the number of frames included in 1 GOP required in order not to decrease the encoding efficiency is set to N', if the number of frames of a last GOP of a bridge clip is less than N', the GOP is combined with one of GOPs before and after the GOP. If the number of frames included in the combined GOP is equal to or larger than a maximum value N of the number of frames included in 1 GOP, the number of frames included in each GOP is made to be within a range of N' to N by dividing the GOP again such that the number of frames included in the GOP is not less than N'. For example, as shown in FIG. 19, when acquiring a minimum encoding section with respect to a cut point, if the number of frames of a last GOP of a bridge clip is less than N' from the phase of a subsequent GOP of the cut point, the subsequent GOP is combined and the resulting GOP is set to a last GOP of the bridge clip.

Figure 19:
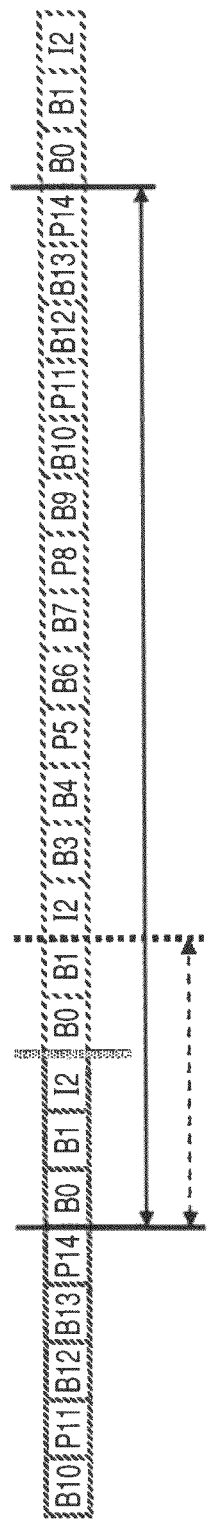
FIG. 19 is a view explaining a minimum encoding section.

In addition, in the case of extending a GOP as shown in FIG. 19, an end point of a minimum encoding section is set up to a GOP break not up to a picture immediately before an I picture subsequent to the GOP as explained with reference to FIG. 18.

In the case shown in FIG. 19, the reason why the end point of the minimum encoding section is set up to a GOP break is that omission of generation occurs but a picture does not change in an I picture and a P picture in the same GOP used as a reference image of P14 used as the last encoding frame and accordingly, it is advantageous in terms of SNR in many cases to set the GOP break as the end point of the minimum encoding section rather than causing omission of generation of B0 and B1 by performing encoding up to B0 and B1 after P14. Also in the case of extending a GOP, the minimum encoding section may be set up to a picture immediately before the next I picture (for example, up to B1 in FIG. 19) similar to the case shown in FIG. 18, without making such exceptional determination.

Figure 20:
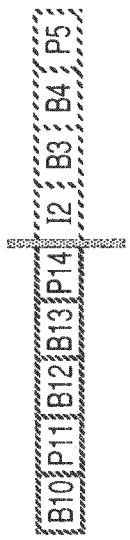
FIG. 20 is a view explaining a minimum encoding section.

In addition, as shown in FIG. 20, when a cut point is a GOP break of a material before a cut point and is immediately before an I picture of a material after a cut point, the length of the minimum encoding section becomes a zero frame. In such a case, for the overlapping element, it is preferable to splice material streams at a cut point without performing decoding and encoding to create a bridge clip.

That is, encoding regarding an edit element block is divided into four patterns according to whether, from a GOP break of a material existing at the start time of a first overlapping element included in the edit element block, it is a picture immediately before an I picture belonging to a GOP of a material existing at the end time of the last overlapping element, a break of the GOP, a picture immediately before an I picture belonging to the next GOP, or a break of the next GOP. In addition, in the case when the edit material ends before the end points, frames up to the end frame are encoded.

Next, four patterns of the end point of the minimum encoding section will be described with reference to FIGS. 21 to 24.

Figure 21:
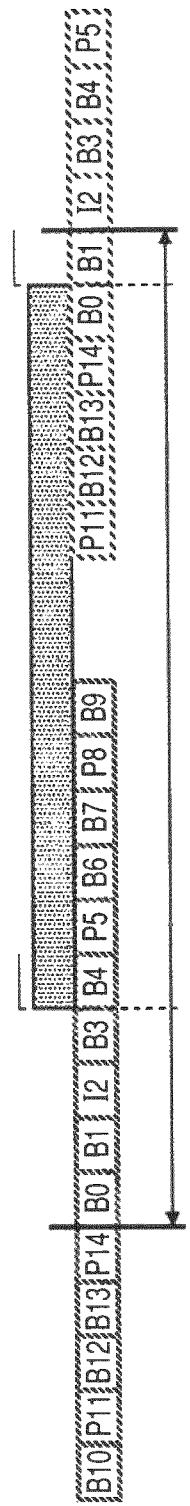
FIG. 21 is a view explaining a minimum encoding section.

FIG. 21 illustrates the first pattern, that is, a case where an end point of the minimum encoding section is a picture immediately before an I picture belonging to a GOP of a material which exists at the end time of the last overlapping element. In FIG. 21, similar to the case shown in FIG. 18, the end point of the minimum encoding section is up to a picture immediately before an I picture immediately after an end frame of an overlapping element. For example, in the case where an overlapping element is an effect or the like and there is no cut point near the effect end point, the end point of the overlapping element and the end point of the minimum encoding section become close and accordingly, a range where omission of generation occurs may be reduced, as shown in FIG. 21.

Figure 22:
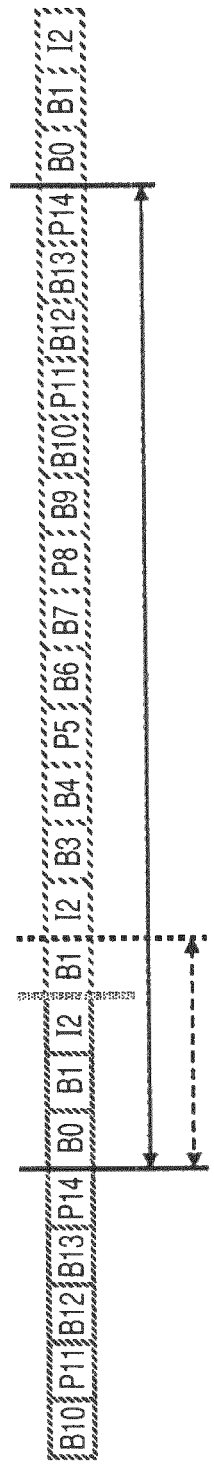
FIG. 22 is a view explaining a minimum encoding section.

FIG. 22 illustrates the second pattern, that is, a case where an end point of the minimum encoding section becomes a break of a GOP of a material which exists at the end time of the last overlapping element. Here, an edit element is a cut point. In addition, as already explained with reference to FIG. 21, in the case where the end point of the minimum encoding section is set to a picture immediately before an I picture belonging to a GOP of a material which exists at the end time of the last overlapping element, the number of frames included in a GOP including a cut point decreases extremely and an image deteriorates. As a result, a section up to the break of the GOP becomes the minimum encoding section in the GOP phase of a material after a cut point.

Figure 23:
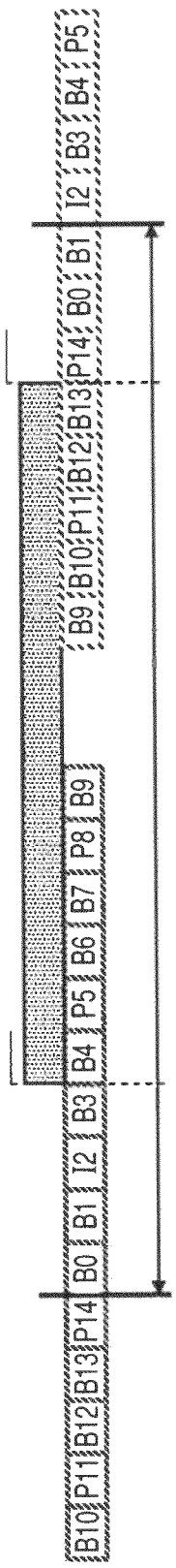
FIG. 23 is a view explaining a minimum encoding section.

FIG. 23 illustrates the third pattern, that is, a case where an end point of the minimum encoding section is a picture immediately before an I picture belonging to a next GOP of a GOP of a material which exists at the end time of the last overlapping element. A picture immediately before an I picture belonging to the GOP of the material which exists at the end time of the effect which is an overlapping element is within a range of the effect. In such a case, the end point of the minimum encoding section becomes a picture immediately before the I picture belonging to the next GOP of the GOP of the material which exists at the end time of the last overlapping element.

Figure 24:
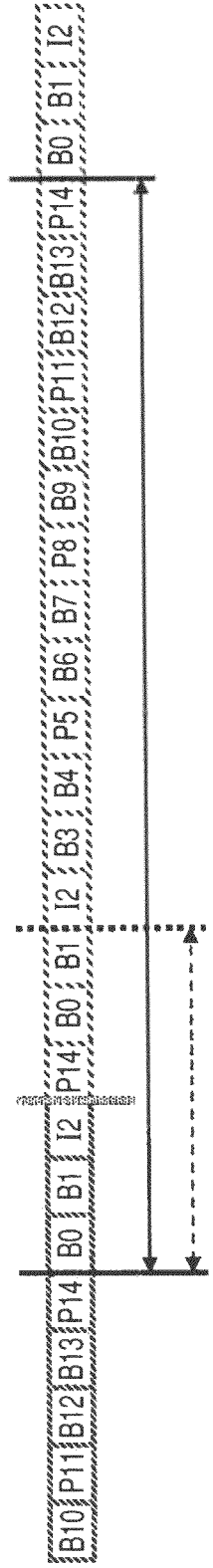
FIG. 24 is a view explaining a minimum encoding section.

In addition, FIG. 24 illustrates the fourth pattern, that is, a case where an end point of the minimum encoding section becomes an end point of a next GOP of a GOP of a material which exists at the end time of the last overlapping element. Here, an edit element is a cut point. In addition, as already explained with reference to FIG. 23, in the case where the end point of the minimum encoding section is set to a picture immediately before an I picture belonging to a next GOP of a GOP of a material which exists at the end time of the last overlapping element, the number of frames included in a GOP including a cut point decreases extremely and an image deteriorates. As a result, a section up to the break of the next GOP becomes the minimum encoding section in the GOP phase of a material after a cut point.

In this manner, the minimum encoding section is set in the unit of a frame as for the edit element block that is temporarily decided. Contents of the minimum encoding section are reflected in an edit information table created by the edit information table creating portion 108.

As described above, the encoder 82 executes encoding processing at the end point of the minimum encoding section set thus, that is, the end point of a bridge clip on the basis of control of the CPU 18 such that VBVoccupancy is seamless in a portion obtained by splicing a bridge clip end point to a portion where decoding and encoding are not performed.

Moreover, in the case where an adjacent edit element block starts or ends before a frame which determines the minimum encoding section appears, specifically, for example, in the case where the adjacent edit element block starts from any frame up to a P14 picture after a cut point in FIG. 24, the edit element block determining portion 106 sets the edit element blocks adjacent to each other as one edit element block.

In addition, in the case where a minimum encoding section corresponding to each edit element block overlaps a minimum encoding section corresponding to an adjacent edit element block, the edit element block determining portion 106 sets the edit element blocks adjacent to each other as one edit element block.

In addition, as described above, in the case where an encoding section is extended in actual encoding processing, the edit element block of the portion is changed on the basis of extension of the encoding section.

That is, the edit element block determining portion 106 decides setting of an edit element block on the basis of the relationship between start time and end time of an overlapping element and whether or not a minimum encoding section decided by the GOP phase of a material on which the overlapping element acts overlaps or extends.

When an operator changes some edit elements using the editing operation panel 20 after deciding the edit element block as described above, the processing described above is repeated for a portion related to the changed edit element, such that an edit element block and a minimum encoding section are obtained.

In addition, the edit information table before the change is stored in the edit information table storage control portion 109 until the editing work using the timeline completely ends. Accordingly, for a portion that the operator has newly changed or a portion with no difference, that is, a portion in which constituent elements as an edit element block are completely equal, it is possible to use information on the edit element block or the minimum encoding section stored in the edit information table storage control portion 109. Furthermore, also in encoding processing, in the case where constituent elements of the edit element block are completely equal referring to the edit information table stored in the edit information table storage control portion 109, it is also possible to use a bridge clip in which encoding has been already completed. In addition, also in the case where the changed edit contents return to the original state, the information can be used without setting the edit element block or the minimum encoding section again or encoding again the same bridge clip as the bridge clip encoded once.

Next, the edit information table created by the edit information table creating portion 108 will be described with reference to FIGS. 25 to 30.

When the edit material and overlapping element recognition portion 102 recognizes edit elements and overlapping elements written on the timeline shown in FIG. 16, each overlapping element and the start time and end time are written in an edit information table as shown in FIG. 25. As for a cut point, the start time and the end time are written as the same time.

In addition, by the edit element block determining portion 106, contents of an edit element block that is temporarily decided for all overlapping elements are reflected in the edit information table created by the edit information table creating portion 108 as shown in FIG. 26. That is, here, a portion including the cut 1 is temporarily decided as an edit element block 1, a portion including wipe and the cut 2 is temporarily decided as an edit element 2, a portion including the cut 3 is temporarily decided as an edit element block 3, a portion including the cut 4 is temporarily decided as an edit element block 4, a portion including telop, the cuts 5 and 6, and mosaic is temporarily decided as an edit element block 5, a portion including the cut 7 is temporarily decided as an edit element block 6, and a portion including the cut 8 is temporarily decided as an edit element block 7.

In addition, in the edit information table, the start time and the end time of the edit element block temporarily decided and information indicating a material stream included in each edit element block are written. Here, the number given to the timeline shown in FIG. 16 is written as information indicating the material stream. However, the information indicating the material stream is configured to include relative time information or data address information, which indicates that the portion written on the timeline as a material corresponds to which portion of the stream, in addition to information allowing streams to be individually distinguished, such as the data name of a stream or a record address in the flash memory 14.

In addition, in the case where a minimum encoding section corresponding to each edit element block is set by the minimum encoding section setting portion 107, information on the set minimum encoding section is reflected in the edit information table created by the edit information table creating portion 108, as shown in FIG. 27. That is, a minimum encoding section of each of the edit element blocks 1 to 7 is set and the start time and the end time are written. For example, in the case where the position of a certain cut point is exactly a GOP break, the minimum encoding section becomes a zero frame as described with reference to FIG. 20. Accordingly, the start time and the end time of the corresponding minimum encoding section are set to the same time.

In addition, on the basis of setting of the edit information table shown in FIG. 27, a result of actual encoding of each minimum encoding section is reflected in resetting of an edit element block performed by the edit element block determining portion 106 and resetting of a minimum encoding section performed by the minimum encoding section setting portion 107. For example, in the case where, for example, extension of encoding is performed and a created bridge clip includes two or more edit element blocks, these edit element blocks are reset as one edit element block.

In addition, contents of the edit element block and the minimum encoding section which are reset are reflected in the edit information table created by the edit information table creating portion 108 as shown in FIG. 28. Here, the edit element block 1 and the minimum encoding section and the edit element block 2 and the minimum encoding section are not changed, but flag information (here, asterisk) indicating that the minimum encoding sections are set on the basis of a past result of encoding is given. In addition, on the basis of the actually encoded result, the original edit element blocks 3 and 4 are set as one edit element block 8, and flag information indicating that the minimum encoding section of the edit element block 8 is set on the basis of a past result of encoding is given. In addition, the edit element blocks 5 to 7 and the minimum encoding sections of them are not changed, but flag information indicating that the minimum encoding sections are set on the basis of a past result of encoding is given.

In addition, as shown in FIG. 29, when addition of telop 2 as a new overlapping element is instructed, resetting of an edit element block of a portion related to the added overlapping element and resetting of a minimum encoding section are executed.

At this time, in a portion which is not related to the new overlapping element, setting of the edit element block and the minimum encoding section that have been already set is used. Accordingly, as shown in FIG. 30, a new edit element block 9 and a minimum encoding section corresponding to the new edit element block 9 are set by addition of the telop 2 which is the added overlapping element. At this time, the minimum encoding section of the edit element block 9 is not set on the basis of a past result of encoding. For this reason, a flag is not attached. In addition, in the case of the other edit element blocks 1, 2, 5, 6, and 7, constituent components are not changed at all by addition of the telop 2. Accordingly, a previous edit element block and the minimum encoding section can be used.

Thus, the edit information table is created, and this information is not eliminated until editing processing using the corresponding timeline completely ends. Accordingly, in the case where addition of the telop 2 shown in FIG. 30 is cancelled, the edit element block and the minimum encoding section of the newly corresponding portion are not reset, but the edit element block 8 before the addition of the telop 2 can be used again.

Next, a proxy image stream created by the proxy encoder 83 shown in FIG. 3 will be described.

The proxy image stream is the same picture as a stream created by encoding performed by the encoder 82. However, the proxy image stream is motion picture data which is used as data at the time of preview or high-speed reproduction or which allows easy communication by reducing the amount of data by extremely reducing the code amount even though the image quality is decreased.

Also in the proxy encoder 83, a proxy image stream after editing is generated by creating a bridge clip by performing necessary minimum encoding and using a stream, for which decoding and encoding are not performed, for the other portions, and then splicing them.

The proxy encoder 83 performs encoding in ClosedGOP, and any of a start point and an end point of the minimum encoding section is set as a break of a GOP. In addition, the proxy encoder 83 executes encoding such that the average created code amount per frame becomes equal in both cases when the lengths of GOPs are fixed or different.

By setting the stream created by the proxy encoder 83 as ClosedGOP and making the end point of the minimum encoding section positioned necessarily at the break of the GOP, a case where mismatch of the reference relationship of pictures occurs in a GOP break does not happen. In addition, in the case of a proxy image stream, the image quality does not need to be so good. Accordingly, by making the average code amount per frame fixed with respect to the arbitrary GOP length, VBVoccupancy can take a fixed value in all GOP breaks. As a result, VBVoccupancy is seamless in all GOP breaks, without setting the value of target VBVoccupancy.

This allows a bridge clip of proxy and a stream, for which decoding and encoding are not performed, to be spliced to each other without any change.

Figure 31:
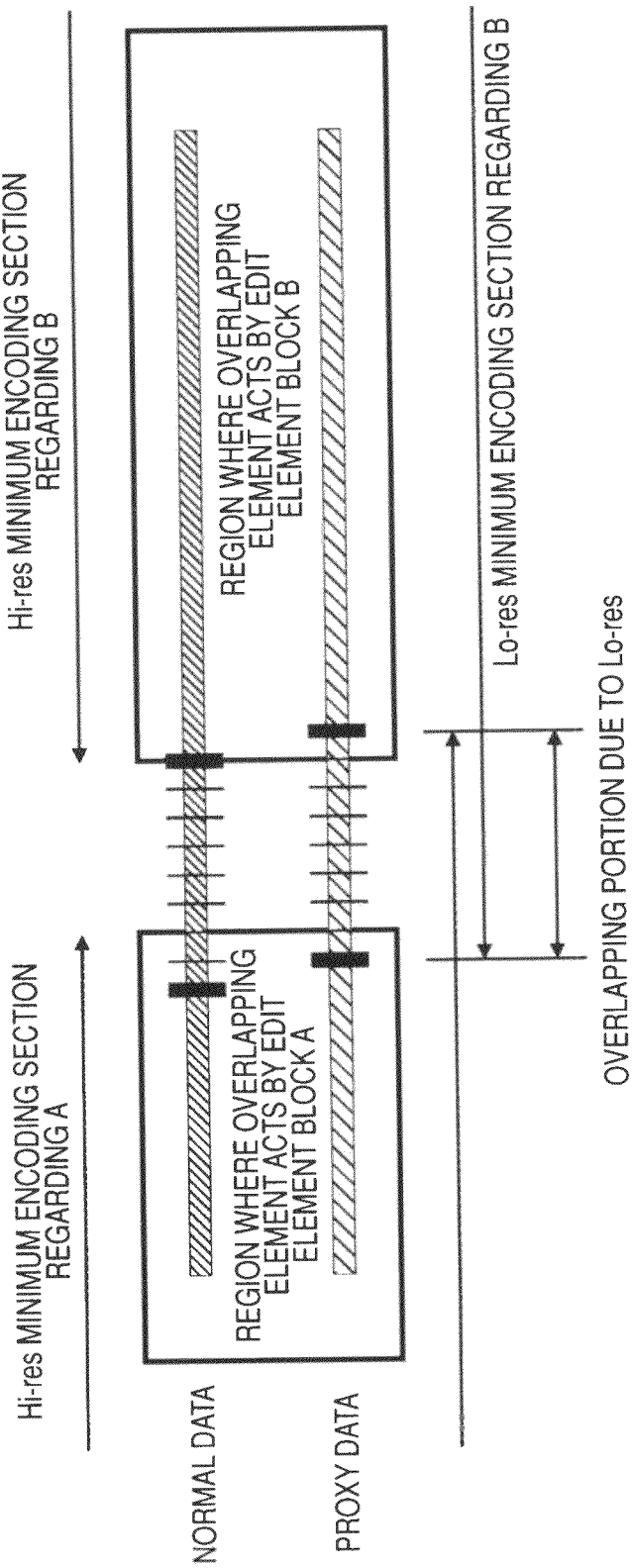
FIG. 31 is a view explaining encoding of a proxy file.

However, as shown in FIG. 31, in the case where the GOP phase of a stream (described as Hi-res in FIG. 31) created by the encoder 82 is different from the GOP phase of a stream (described as Lo-res in FIG. 31) created by the proxy encoder 83, a case where a portion that can be encoded as different bridge clips in the encoder 82 should be encoded as one bridge clip in the proxy encoder 83 occurs.

For example, a case where 1 GOP is 15 frames in the stream (Hi-res) created by the encoder 82 but 1 GOP is 10 frames in the stream (Lo-res) created by the proxy encoder 83 and the arbitrary GOP length is allowed depending on editing is considered.

For example, in the stream (Lo-res) created by the proxy encoder 83, a range where an overlapping element in the edit element block A acts on a material is up to a picture immediately before an I picture of a GOP including an end frame. When the start point of the edit element block B subsequent to the edit element block A is exactly at the next GOP break, minimum encoding sections of the edit element block A and the edit element block B of the stream (Lo-res) created by the proxy encoder 83 do not overlap each other, as shown in FIG. 31.

On the other hand, in the case where the GOP phase of the stream (Lo-res) created by the proxy encoder 83 shifts from the stream (Lo-res) created by the proxy encoder 83 and accordingly, a range where an overlapping element in the edit element block A acts on a material is a first frame of a certain GOP, the minimum encoding section in the edit element block A becomes the break of the GOP. Furthermore, in FIG. 31, in the stream (Lo-res) created by the proxy encoder 83, the start point of the edit element block B subsequent to the edit element block A exists before the end point of the minimum encoding section of the edit element block A. Therefore, the proxy encoder 83 should encode, as one bridge clip, the edit element block A and the edit element block B that could be encoded as different bridge clips in the encoder 82.

In such a case, an edit element block and a minimum encoding section may be set again in a state where a past result of encoding performed by the proxy encoder 83 is made to be reflected and encoding processing using the encoder 82 may be executed on the basis of the edit element block and the minimum encoding section which are newly set.

Moreover, in order to prevent the encoding processing using the encoder 82 from being executed again according to the past result of encoding performed by the proxy encoder 83 as described above, it is preferable to make the minimum GOP length in encoding performed by the encoder 82 larger than the maximum GOP length of encoding performed by the proxy encoder 83 or to make the GOP lengths and GOP phases in the encoding processing performed by the encoder 82 and the encoding processing performed by the proxy encoder 83 always equal.

In any case, the number of bridge clips of Lo-res created by encoding using the proxy encoder 83 is equal to the number of bridge clips of Hi-res created by encoding using the encoder 82. In this case, for the same overlapping elements, ranges may be different but an edit element block and a minimum encoding section should be set such that they correspond.

In addition, also regarding encoding performed by the proxy encoder 83, it is needless to say that the same edit information table be created by the edit information table creating portion 108, similar to the case in encoding performed by the encoder 82. By making the edit information table storage control portion 109 also store an edit information table for proxy, it is possible to prevent the same setting processing or encoding processing from being repeated by using information of the stored edit information table at the time of changing an edit element.

Figure 32:
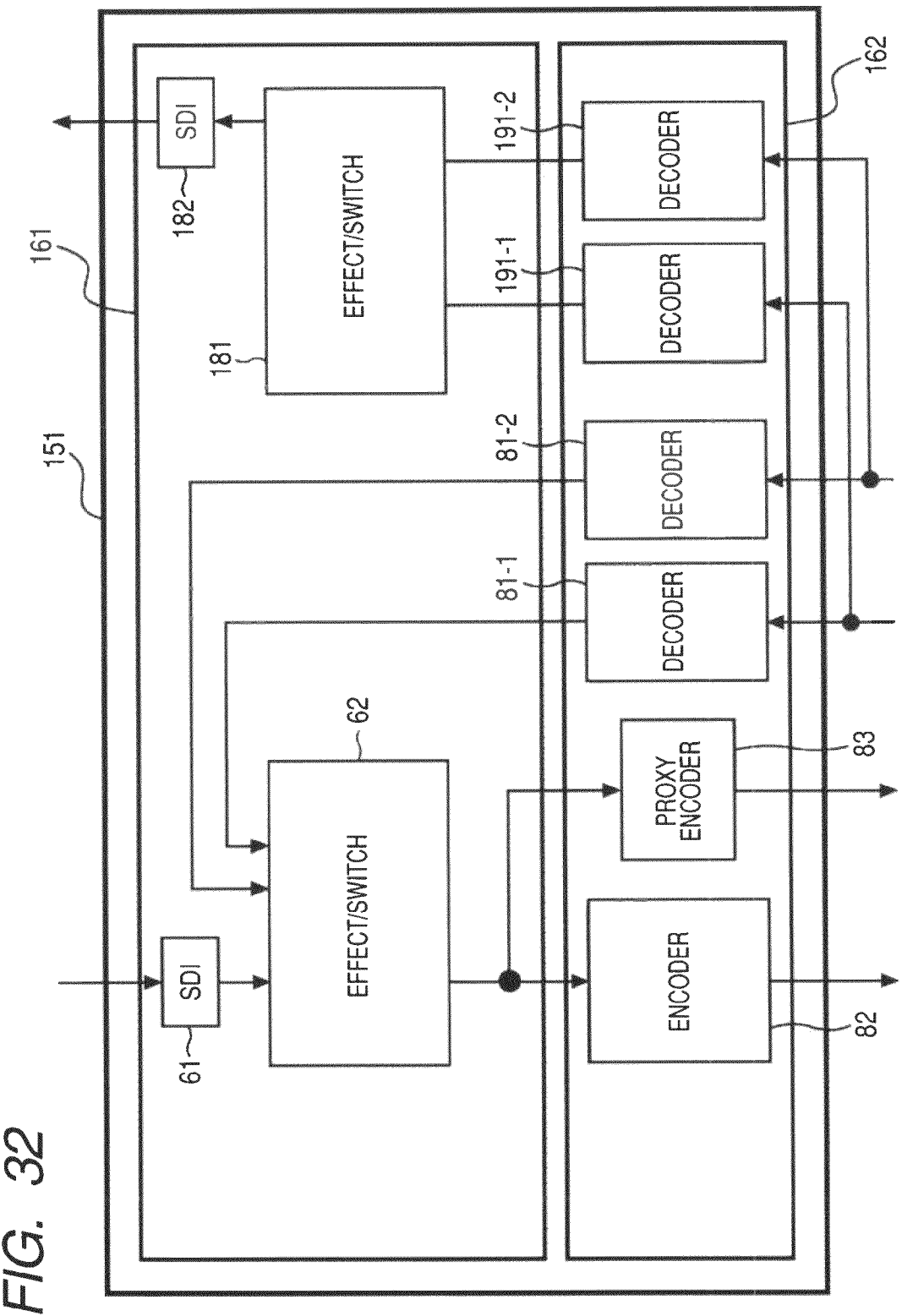
FIG. 32 is a block diagram illustrating another example of the configuration of the SDI input/output port.

In addition, the editing processing described above may also be executed by using an SDI input/output port 151, which is shown in FIG. 32, instead of the SDI input/output port 11 described with reference to FIG. 3.

In addition, in FIG. 32, portions corresponding to those in the SDI input/output port 11 shown in FIG. 3 are denoted by the same reference numerals, and an explanation thereof will be appropriately omitted.

That is, the SDI input/output port 151 shown in FIG. 32 includes an input/output processing portion 161 instead of the input/output processing portion 41 and includes a CODEC processing portion 162 instead of the CODEC processing portion 42. The input/output processing portion 161 has the same configuration as the CODEC processing portion 42 except that an effect/switch 181 is newly provided and an SDI output portion 182, which outputs an output from the effect/switch 181, is provided instead of the SDI output portion 63. In addition, the CODEC processing portion 162 has the same configuration as the CODEC processing portion 42 except that decoders 191-1 and 191-2 are newly provided.

The SDI input portion 61, the effect/switch 62, the decoders 81-1 and 81-2, the encoder 82, and the proxy encoder 83 execute decoding, editing, and encoding processing for an edit element block set on the timeline, that is, processing related to creation of a bridge clip similar to the case in the SDI input/output port 11 shown in FIG. 3.

On the other hand, the effect/switch 181, the SDI output portion 182, the decoders 191-1, and 191-2 execute processing for creating a preview used when an operator checks the edit contents.

The decoders 191-1 and 191-2 are supplied with an encoded stream, which is an edit material, and decode the encoded stream. A non-compressed video signal corresponding to the decoded edit material is supplied to the effect/switch 181.

The effect/switch 181 is supplied with the non-compressed video signal from the decoders 191-1 and 191-2 and changes an output of the supplied non-compressed video signal on the basis of control of the CPU 18, that is, performs cut point processing for combining the supplied non-compressed video signals in a predetermined frame. In addition, the effect/switch 181 also performs processing for giving the editing effects, such as granting of an effect, to the non-compressed video signal supplied.

In the SDI input/output port 151 having such a configuration, encoding for the edit element block set on the timeline may be executed regardless of a preview operation of an operator in the background.

For example, in the case where encoding of an edit element block is executed automatically in the background without receiving an operator's instruction to start encoding, there is a high possibility that the total encoding time will be shortened in a case that execution is made from encoding regarding an edit element block positioned in the ahead on the timeline when extension of encoding has occurred.

On the other hand, the operator may instruct encoding of an edit element block to be executed for every edit element block by referring to the timeline.

In addition, the operator desires to recognize whether or not processing for a portion which is a bridge clip or a portion which is not abridge clip, among streams after editing, or encoding processing for an each edit element block has been completed irrespective of whether or not a preview exists or whether encoding processing is performed automatically in the background or is carried out only in the case where it is clearly designated.

Accordingly, information indicating to which portions the edit element block and the minimum encoding section correspond and information indicating that an encoding result was already obtained for each edit element block are preferably displayed together with the timeline on the display portion of the editing operation panel 20.

Therefore, the display control portion 105 displays a GUI on the display portion of the editing operation panel 20 so as to be related to the timeline on the basis of information on the edit material and overlapping elements in editing supplied from the edit material and overlapping element recognition portion 102, so that the operator can make a check at an arbitrary point. The GUI includes a figure allowing edit element blocks, which are calculated by the timeline that the operator set, to be individually distinguished and a figure, which indicates a minimum encoding section in each edit element block, and is able to show to the user information indicating whether or not it is a minimum encoding section, in which the encoding result obtained by actually encoding an edit element block is reflected, that is, information indicating whether or not encoding of each edit element block is already completed.

An example of the above-described GUI related to the timeline, which is displayed by the display control portion 105, will be described with reference to FIGS. 33 to 36.

In the case where the operator determines all materials and overlapping elements on the timeline or determines some of the materials and overlapping elements, setting of an edit element block and a minimum encoding section is possible only in the portion determined. For this reason, a required GUI is displayed in association with the timeline so that the operator can recognize the edit element block and the minimum encoding section which are set.

Figure 33:
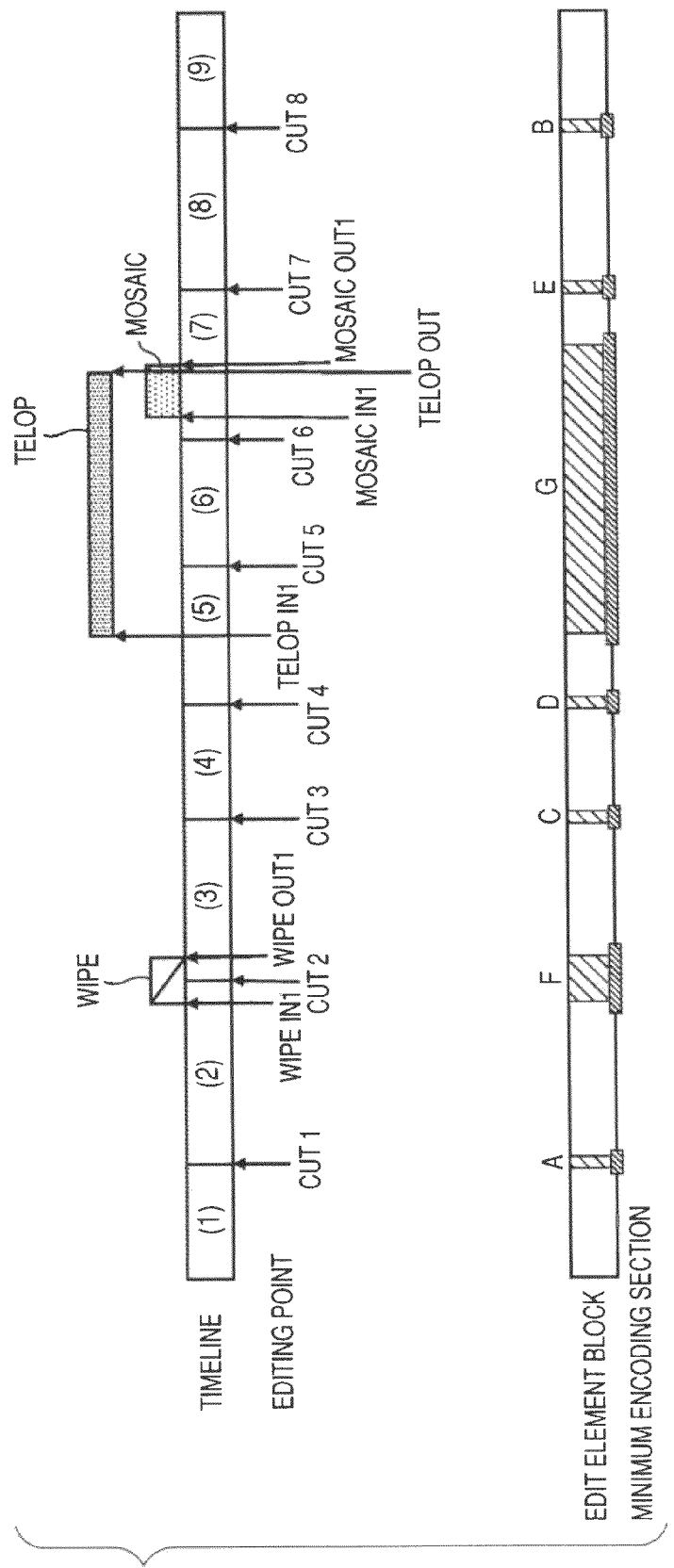
FIG. 33 is a view explaining a GUI displayed together with a timeline.

For example, as shown in an upper part of FIG. 33, in the case when the operator determines all materials and overlapping elements on the timeline, the operation can recognize a region of an edit element block, which is determined on the basis of setting on the timeline, and a minimum encoding section corresponding to the region by a GUI shown in a lower part of FIG. 33.

In addition, since calculation processing can be performed while the operator is creating the timeline, it is possible to perform GUI display of the edit element block or the minimum encoding section. For example, a time range of an overlapping element of an edit element block is decided even if the material is not decided. Accordingly, since calculation can be performed even if decision of a material is not decided yet, the minimum encoding section can be calculated at a point of time when materials on both ends of an edit element block are decided.

That is, also in the case where the operator has not determined all materials and overlapping elements on the timeline, the same GUI can be displayed. For example, even for a timeline which is shown in an upper part of FIG. 34 and in which a portion corresponding to the material 6 in the timeline shown in the upper part of FIG. 33 is not determined yet, an edit element block and its minimum encoding section are calculated on the basis of the overlapping element set on the timeline. Accordingly, through the GUI shown in a lower part of FIG. 34, the operator can recognize a region of the edit element block, which is decided on the basis of setting on the timeline, and a minimum encoding section corresponding to the region.

Figure 34:
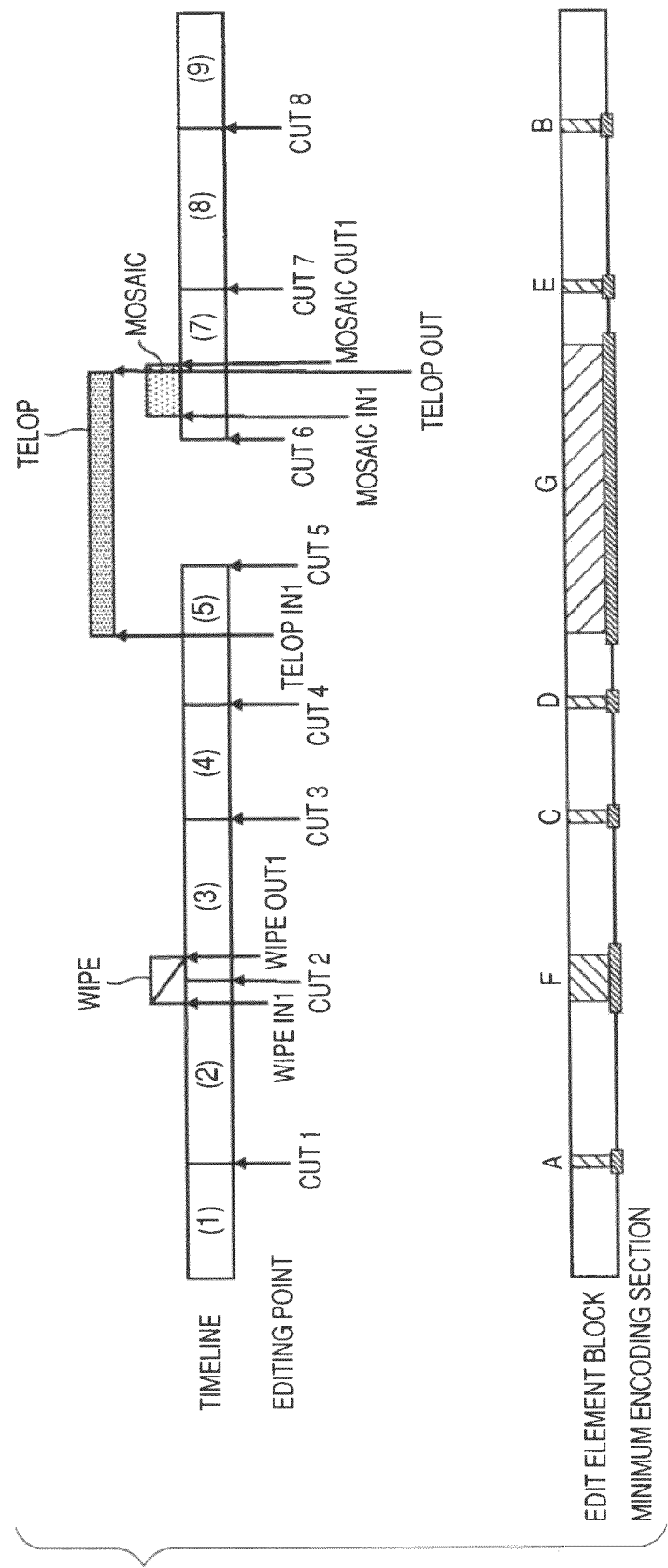
FIG. 34 is a view explaining a GUI displayed together with a timeline.

In addition, also in FIGS. 33 and 34, a GUI showing the section of an edit element block is displayed together with a name (described herein with the alphabet of A, B, . . . , but it is preferable not to use I and O in this case) specifying the edit element block and a minimum encoding section clearly corresponding to the edit element block is displayed. Here, names specifying the edit element blocks are preferably set to be able to be individually distinguished, for example, are named in the order from an edit element block in which an operation has ended.

Since a material is not decided yet in the case of an edit element block G shown on a GUI in a lower part of FIG. 34, constituent elements of the edit element block have not been completely decided. Therefore, it is more preferable that the edit element block G, which is shown on the GUI in the lower part of FIG. 33 and in which constituent elements of the edit element block have not been completely decided, be displayed to be distinguishable.

For example, preferably, it is notified to the operator that a material is not decided yet by making a portion, which corresponds to the edit element block G shown on the GUI in the lower part of FIG. 34 and in which constituent elements of the edit element block are not completely decided, blink, changing a display color so as to be distinguished from the other portions, or displaying a comment, such that input of a material is urged.

However, in the case where it is instructed to encode the portion in which constituent elements of the edit element block are not completely decided, the edit element block is decided by determining that a null material is designated in the portion. The null material may be considered as a true black image, so-called 'Black'. However, the true black image has a large influence on control of a VBV buffer in encoding processing. Accordingly, in the case where it is necessary to perform actual encoding including a null material, it is necessary to perform zerostuffing for changing in an average rate such that VBVoccupancy does not go up and down in the unit of a GOP if possible.

In addition, for the null material, a simple image, such as a pure white image (White) or a color bar (ColorBar) may be set other than Black. As an encoding rule, preferably, zerostuffing is executed for every picture if possible, the code amount of an average rate is used, and VBVoccupancy does not change at the start and end of a GOP. In addition, for example, the operator may arbitrarily set the used code amount of a null material by setting the existence of zerostuff.

Figure 35:
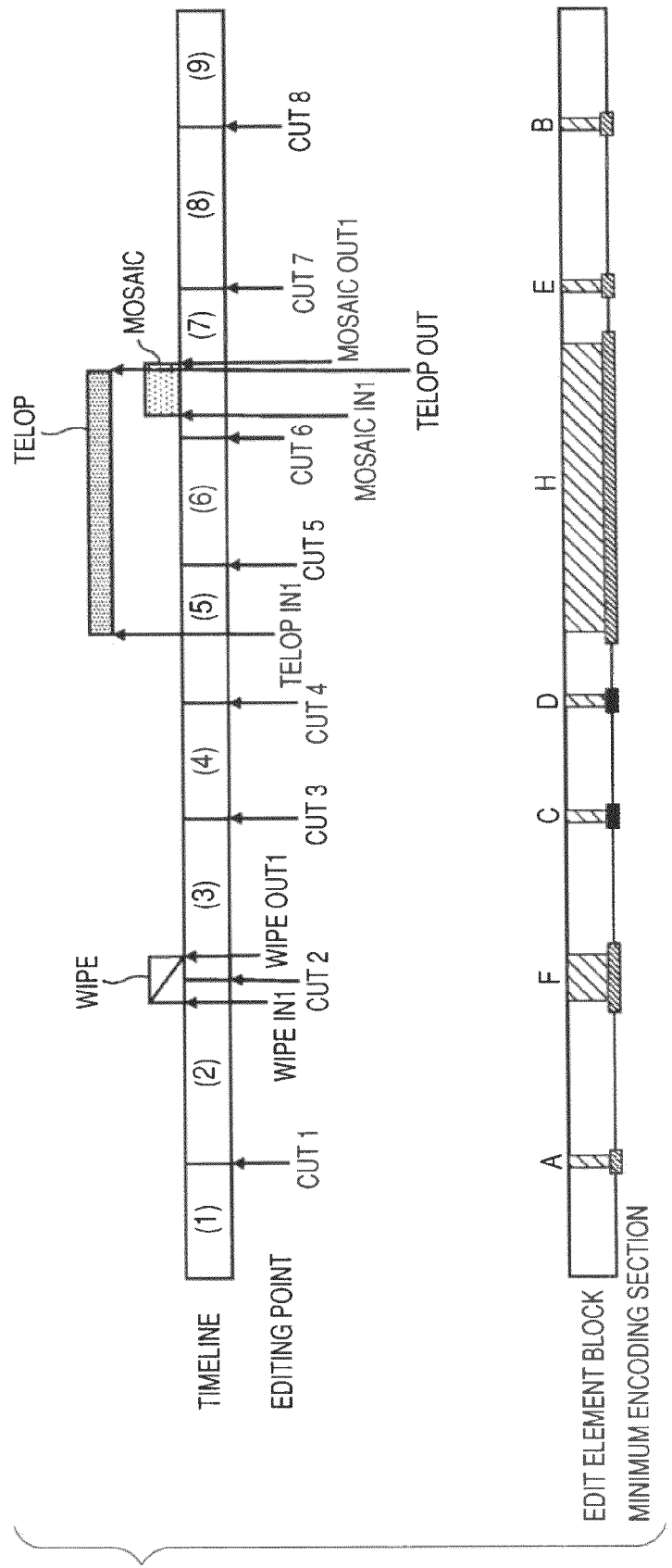
FIG. 35 is a view explaining a GUI displayed together with a timeline.

In addition, in order to make it distinguishable whether or not encoding has been executed in each minimum encoding section, for example, figures indicating minimum encoding sections of edit element blocks C and D for which encoding has been completed may be displayed in the color or shape different from the other edit element blocks on the GUI in the lower part of FIG. 35.

In addition, in the case where the contents of telop and the contents of mosaic have been changed, the name of the edit element block is changed from G to H since constituent elements of the edit element block have been changed.

As described above, in the case of the configuration in which encoding can be executed in the background, if encoding is made to start from earlier time if possible, it is not necessary to execute encoding of the overlapping portion again even if resetting of the minimum encoding section when an encoding range has extended causes setting change for making a plurality of edit element blocks one, which is preferable. On the other hand, in the case where an instruction to start preview or encoding is to be clearly made, it is preferable that display of an edit element block for which encoding is not completed be selectively decided, for example, by movement of a mouse cursor or by inputting the name of a desired edit element block with a keyboard, such that start of preview or encoding can be instructed.

In addition, when a portion corresponding to a certain edit element block is being encoded, the edit element block may also be displayed for the operator by first converting the display color to a color, which indicates that encoding has been completed, in synchronization with a region where encoding has been performed on the figure indicating a minimum encoding section displayed with a color indicating that encoding is not performed yet.

Figure 36:
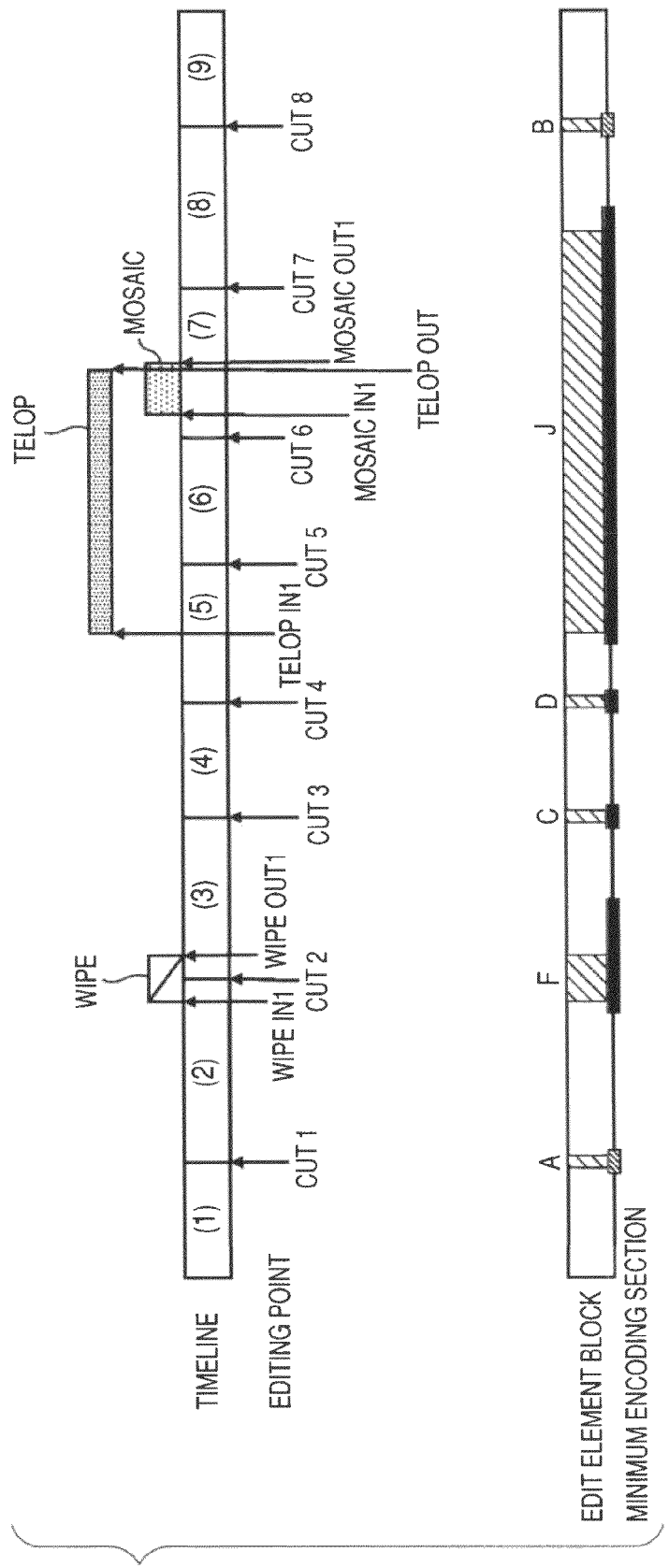
FIG. 36 is a view explaining a GUI displayed together with a timeline.

In addition, when encoding of a portion displayed as an edit element block H on a GUI in a lower part of FIG. 35 has been executed, if the encoding range is extended to include the next edit element block E, display is performed such that the operator can recognize that a change to a new edit element block J has been made as shown in a lower part of FIG. 36.

In this manner, the display control portion 105 can display the GUI, which allows the edit element block and the minimum encoding section to be notified to the operator, together with the timeline, on the display portion of the editing operation panel 20 on the basis of information on the edit material and overlapping elements in editing supplied from the edit material and overlapping element recognition portion 102.

In this case, even if there is a material which is not determined, in a condition where an overlapping element is determined and setting of an edit element block and setting of a minimum encoding section are possible, it is possible to set the edit element block and the minimum encoding section and to display the set result. Here, in the case where there is a material which is not determined, it is preferable to show the material to the operator by blink or change of a display color, for example.

Furthermore, it is notified to the operator whether encoding of the minimum encoding section has been completed or the minimum encoding section is being encoded with the change of a display color, for example. Furthermore, when setting of an edit element block or a minimum encoding section has been changed by execution of encoding or change of an overlapping element, the contents are to be reflected in a GUI at any time. In the case where there is a change even in a part of constituent elements of the edit element block, it is needless to say that a name given to make the edit element block distinguishable be changed.

In addition, as described above, the edit information table storage control portion 109 stores an edit information table created by the edit information table creating portion 108. Therefore, the same GUI showing the edit element block and the minimum encoding section corresponding to an arbitrary past edit information table stored may be further displayed, such that the operator can compare the configuration of a current edit element block with that of the former one or can easily select the encoding result already prepared in order to use the encoding result again.

The same display format as a GUI showing the edit element block and the minimum encoding section in the current editing state is used for the GUI showing the edit element block and the minimum encoding section corresponding to the past edit information table stored. That is, also in the GUI showing the edit element block and the minimum encoding section corresponding to the past edit information table, a name is given to the edit element block so as to be individually distinguishable and it is distinguishably displayed whether encoding has been completed or not such that the operator can recognize the situation.

In addition, also in a GUI showing the edit element block and the minimum encoding section corresponding to the past edit information table, an instruction to start preview or encoding is made to be performed by selectively deciding a portion of a desired edit element block of the GUI with a mouse cursor, for example, or by inputting a name with a keyboard or the like.

Next, edit element block setting processing will be described with reference to flow charts shown in FIGS. 37 and 38.

In step S11, the operation input acquisition portion 101 receives an instruction of setting or change of edit elements that the operator has input by using the editing operation panel 20 and that is arranged on the timeline. The edit material and overlapping element recognition portion 102 recognizes the edit material and overlapping elements instructed for editing on the basis of the operator's operation input supplied from the operation input acquisition portion 101 and supplies the recognized edit material and overlapping elements to the display control portion 105, the edit element block determination portion 106, and the edit information table creating portion 108.

In step S12, when the edit information table of the same timeline already exists and information regarding past encoding is stored by processing of the edit information table storage control portion 109, the edit element block determining portion 106 and the minimum encoding section setting portion 107 acquire the information.

In step S13, the edit element block determining portion 106 extracts overlapping elements on the basis of information on edit materials and overlapping elements in editing supplied from the edit material and overlapping element recognition portion 102 and arranges the extracted overlapping elements in the order of early start time.

In step S14, the edit element block determining portion 106 extracts one corresponding to earliest start time, among overlapping elements which are not temporarily decided as an edit element block, as a noted overlapping element.

In step S15, the edit element block determining portion 106 determines whether or not there is an overlapping element that starts at the same time as the noted overlapping element. If it is determined that there is no overlapping element that starts at the same time in step S15, the process proceeds to step S17.

If it is determined that there is an overlapping element that starts at the same time in step S15, the edit element block determining portion 106 sets the overlapping element, which starts at the same time as the noted overlapping element, as the same edit element block in step S16.

If it is determined that there is no overlapping element that starts at the same time in step S15 or in step S17 after processing in step S16 is completed, the edit element block determining portion 106 determines whether or not an overlapping element subsequent to the noted overlapping element or the edit element block including the noted overlapping element exists. If it is determined that there is no subsequent overlapping element in step S17, the process proceeds to step S21 to be described later.

If it is determined that there is a subsequent overlapping element instep S17, the edit element block determining portion 106 determines whether or not the start time of the subsequent overlapping element is later than the end time of an overlapping element located before the subsequent overlapping element in step S18.

If it is determined that the start time of the subsequent overlapping element is not later than the end time of an overlapping element located before the subsequent overlapping element in step S18, the edit element block determining portion 106 sets the subsequent overlapping element as the same edit element block as the noted overlapping element in step S19 and then the process returns to step S17 to repeat subsequent processes.

If it is determined that the start time of the subsequent overlapping element is later than the end time of an overlapping element located before the subsequent overlapping element in step S18, the edit element block determining portion 106 temporarily decides an edit element block including the noted overlapping element in step S20 and then the process returns to step S14 to repeat subsequent processes.

If it is determined that there is no subsequent overlapping element in step S17, the edit element block determining portion 106 supplies information on the edit element block, which is temporarily decided, to the edit information table creating portion 108 and the minimum encoding section setting portion 107 in step S21. The edit information table creating portion 108 creates or updates an edit table creating portion by using the information on the edit element block temporarily decided as described above. In addition, the minimum encoding section setting portion 107 arranges the edit element blocks temporarily decided in the order of early start time.

In step S22, the minimum encoding section setting portion 107 extracts one corresponding to earliest start time among the edit element blocks where minimum encoding sections are not set.

In step S23, the minimum encoding section setting portion 107 determines whether or not a past result of encoding processing in the extracted edit element block exists on the basis of the past edit information table stored in the edit information table storage control portion 109.

If it is determined that there is a past result of encoding processing in the extracted edit element block in step S23, the minimum encoding section setting portion 107 sets a minimum encoding section, which is written in the past edit information table stored in the edit information table storage control portion 109, as a minimum encoding section of the edit element block in step S24.

If it is determined that there is no past result of encoding processing in the extracted edit element block in step S23, the minimum encoding section setting portion 107 calculates and sets a minimum encoding section on the basis of the GOP phase of a stream before and after the edit element block in step S25.

After processing in step S24 or step S25 ends, the minimum encoding section setting portion 107 determines whether or not another edit element block to which the minimum encoding section is adjacent or a part of which overlaps the minimum encoding section exists in step S26.

If it is determined that the adjacent or overlapping edit element block exists in step S26, the minimum encoding section setting portion 107 sets the adjacent or overlapping edit element blocks as one edit element block in step S27 and then the process returns to step S22 to repeat subsequent processes.

If it is determined that there is no adjacent or overlapping edit element block in step S26, the minimum encoding section setting portion 107 determines whether or not all minimum encoding sections of the edit element block are set in step S28. If it is determined that all minimum encoding sections of the edit element block are not set in step S28, the process returns to step S22 to repeat the subsequent processes.

If it is determined that all minimum encoding sections of the edit element block are set in step S28, the minimum encoding section setting portion 107 supplies information on the set minimum encoding section to the edit information table creating portion 108 and the edit element block determining portion 106 in step S29. The edit element block determining portion 106 decides an edit element block on the basis of the set contents of the minimum encoding section and supplies the decided contents to the edit information table creating portion 108. Then, the edit information table creating portion 108 creates or updates an edit information table where the edit elements included in the edit element block determined by the edit element block determining portion 106, information on the edit elements, and the minimum encoding section set by the minimum encoding section setting portion 107 are described and supplies the edit information table to the edit information table storage control portion 109 so as to be stored, and thus processing is ended.

Since the edit element block is set by such processing, it is possible to prevent the same part from being decoded and encoded repeatedly regardless of a combination method of edit elements.

In addition, since the edit information table in which information on the edit element block or the minimum encoding section is written is created to be recorded, it becomes not necessary to perform resetting of edit element blocks or minimum encoding sections of all portions on the timeline by referring to the recorded edit information table when some of the edit elements are changed or are returned to the original state after the change, which is preferable.

Figure 39:
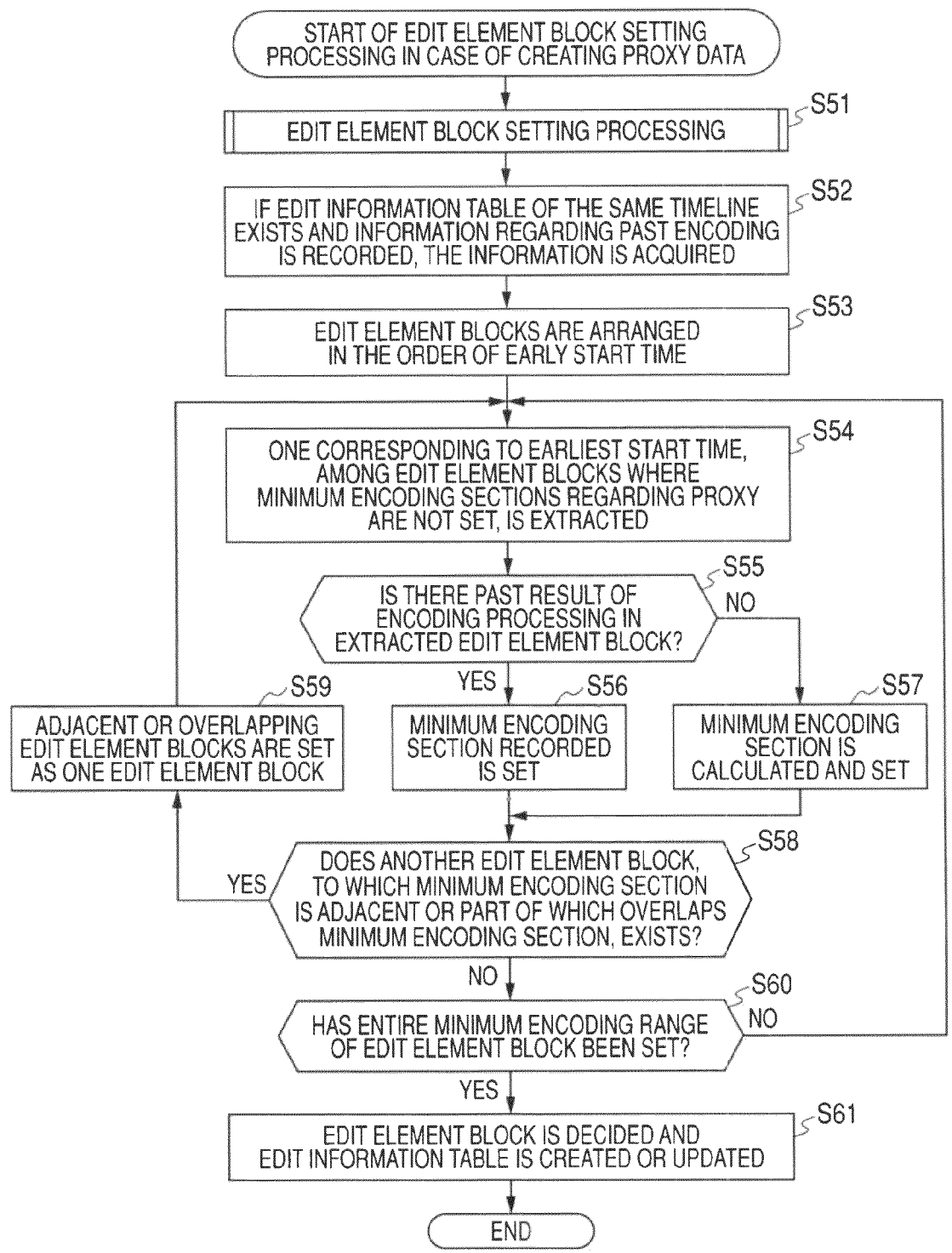
FIG. 39 is a flow chart explaining edit element block setting processing in the case of generating proxy data.

Next, edit element block setting processing in the case of creating proxy data will be described with reference to a flow chart shown in FIG. 39.

Figure 37:
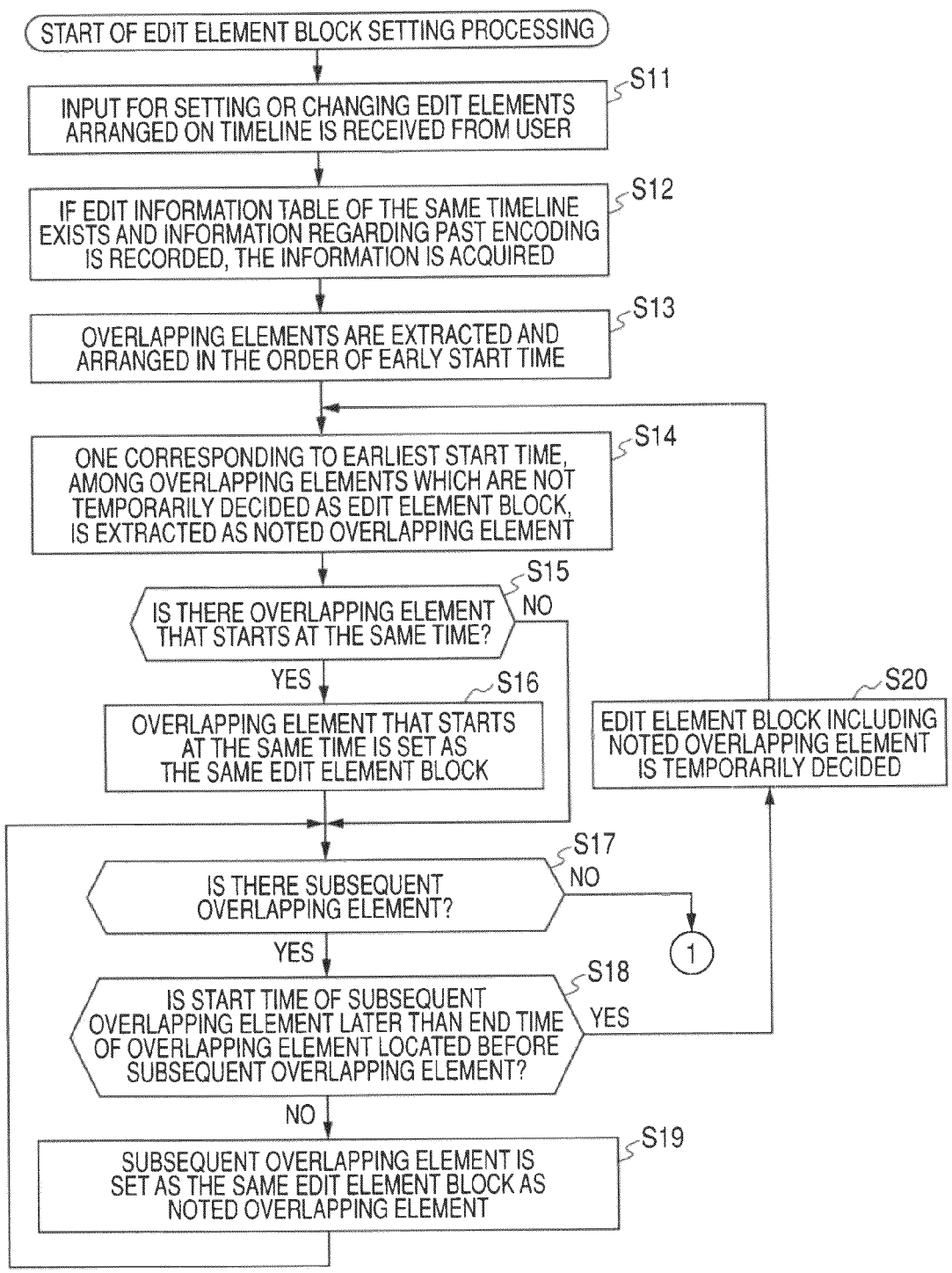
FIG. 37 is a flow chart explaining edit element block setting processing.
Figure 38:
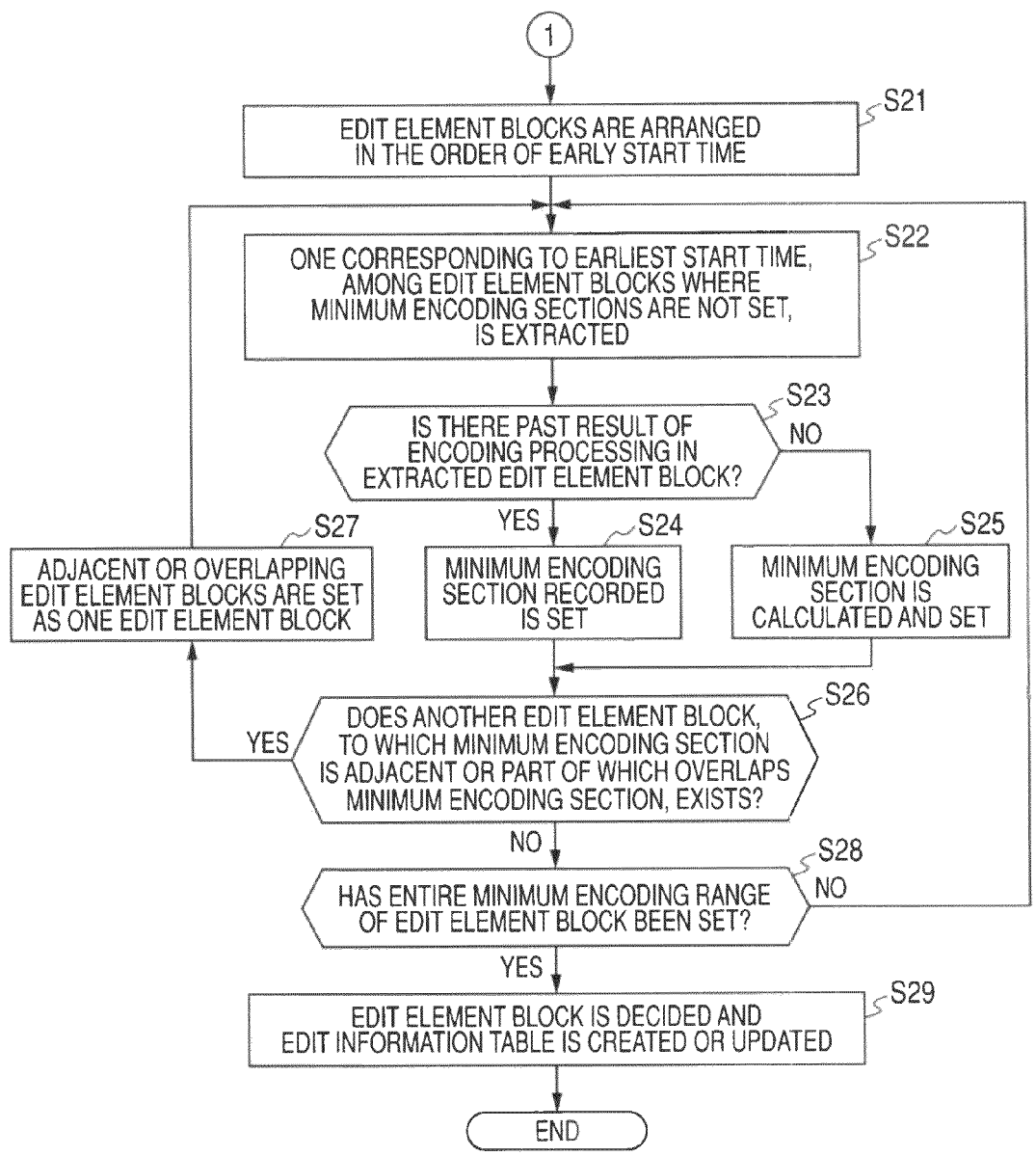
FIG. 38 is a flow chart explaining the edit element block setting processing.

In step S51, the edit element block setting processing described with reference to FIGS. 37 and 38 is executed, such that setting of the edit element block and the minimum encoding section for a normal bridge clip encoded by the encoder 82 and creation and storage of the edit information table are executed.

In step S52, the edit element block determining portion 106 and the minimum encoding section setting portion 107 acquire information of the edit information table.

In step S53, the edit element block determining portion 106 sets edit element blocks for the normal bridge clip encoded by an encoder 82 as edit element blocks for encoding for proxy data and arranges the edit element blocks in the order of early start time.

In step S54, the minimum encoding section setting portion 107 extracts one corresponding to the earliest start time among the edit element blocks where minimum encoding sections regarding proxy are not set.

In step S55, the minimum encoding section setting portion 107 determines whether or not there is a past result of encoding processing in the extracted edit element block regarding proxy data on the basis of the past edit information table stored in the edit information table storage control portion 109.

If it is determined that there is a past result of encoding processing in the extracted edit element block in step S55, the minimum encoding section setting portion 107 sets a minimum encoding section, which is written in the past edit information table stored in the edit information table storage control portion 109, as a minimum encoding section regarding proxy data of the edit element block in step S56.

If it is determined that there is no past result of encoding processing in the extracted edit element block in step S55, the minimum encoding section setting portion 107 calculates and sets a minimum encoding section regarding proxy data on the basis of the GOP phase of a stream before and after the edit element block in step S57.

After processing in step S56 or step S57 ends, the minimum encoding section setting portion 107 determines whether or not another edit element block to which the minimum encoding section is adjacent or a part of which overlaps the minimum encoding section exists in step S58.

If it is determined that the adjacent or overlapping edit element block exists in step S58, the minimum encoding section setting portion 107 sets the adjacent or overlapping edit element block as one edit element block in step S59 and then the process returns to step S54 to repeat subsequent processes.

If it is determined that there is no adjacent or overlapping edit element block in step S58, the minimum encoding section setting portion 107 determines whether or not all minimum encoding sections of the edit element block for proxy are set in step S60. If it is determined that all minimum encoding sections of the edit element block are not set in step S60, the process returns to step S54 to repeat the subsequent processes.

If it is determined that all minimum encoding sections of the edit element block are set in step S60, the minimum encoding section setting portion 107 supplies information on the set minimum encoding section for proxy to the edit information table creating portion 108 and the edit element block determining portion 106 in step S61. The edit element block determining portion 106 decides an edit element block on the basis of the set contents of the minimum encoding section for proxy and supplies the decided contents to the edit information table creating portion 108 similar to setting for the normal bridge clip encoded by the encoder 82. Then, the edit information table creating portion 108 creates or updates an edit information table where the edit elements included in the edit element block determined by the edit element block determining portion 106, information on the edit elements, and the minimum encoding section set by the minimum encoding section setting portion 107 are described and supplies the edit information table to the edit information table storage control portion 109 so as to be stored, and thus processing is ended.

In order to similarly create a bridge clip corresponding to the bridge clip created by the encoder 82 through such processing, the edit element block and minimum encoding section for proxy can be set. In addition, in the case where setting of an edit element block has been changed to create a proxy image stream, setting of the edit element block may also be reflected for creation of the bridge clip using the encoder 82.

Figure 40:
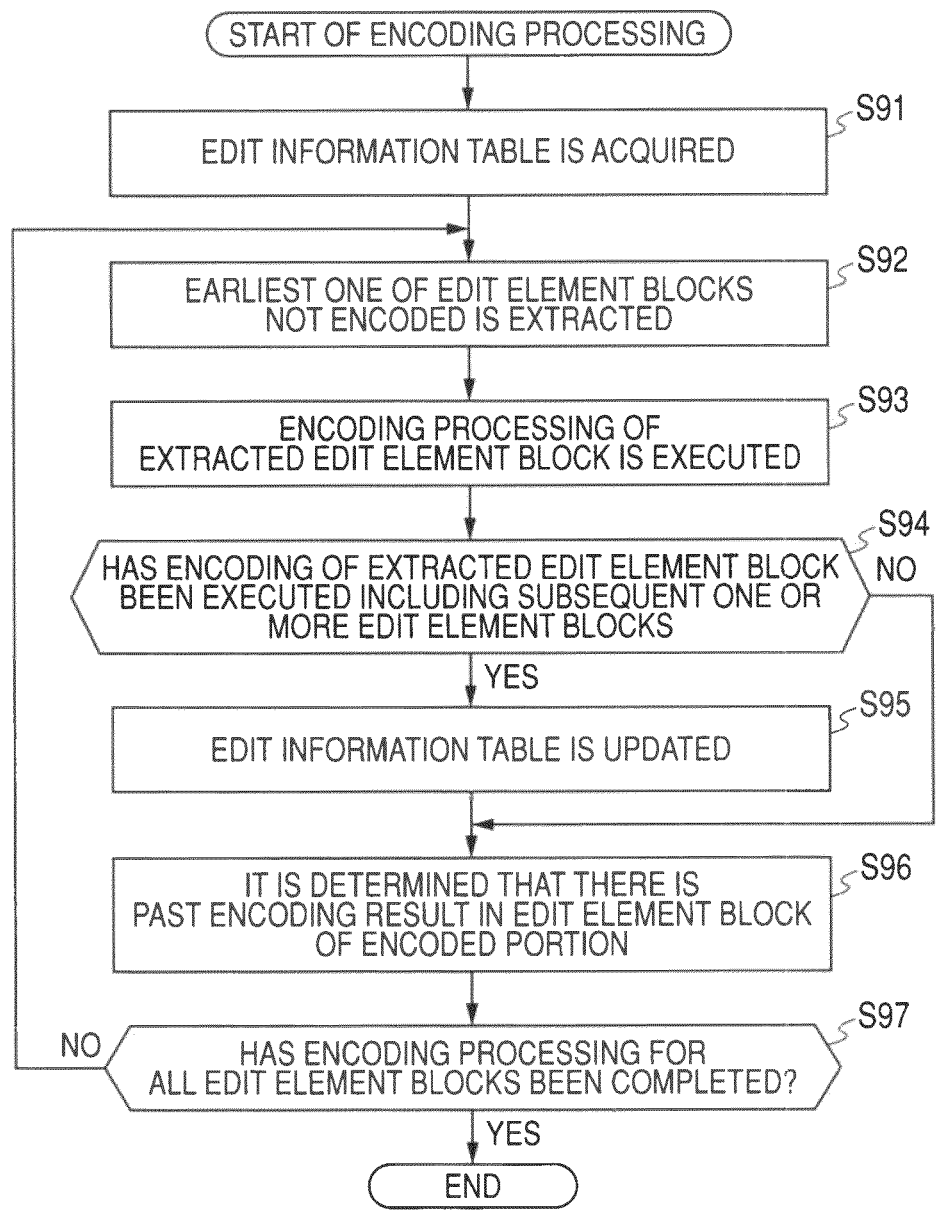
FIG. 40 is a flow chart explaining encoding processing.

Next, encoding processing executed in the case where the encoder 82 or the proxy encoder 83 creates a bridge clip will be described with reference to a flow chart shown in FIG. 40.

In step S91, the edit control portion 110 acquires the edit information table corresponding to the timeline currently displayed, which has been created in the edit information table creating portion 108.

In step S92, the edit control portion 110 extracts earliest one of the edit element blocks not encoded with reference to the edit information table.

In step S93, the edit control portion 110 creates a command for executing encoding processing of the extracted edit element block and supplies the command to the CPU 18. The decoding processing portion 121 of the CPU 18 controls decoding, which is performed by the decoder 81-1 or 81-2 of a corresponding portion of a material stream that is a constituent element of the corresponding edit element block, on the basis of the command issued from the edit control portion 110. The SDI Input/output control portion 122 executes a control of input of an SDI signal corresponding to, for example, telop or picture in picture from the SDI input portion 61 on the basis of the command issued from the edit control portion 110.

In addition, the portion 123 for controlling switching and the like controls switching of output of a non-compressed video signal using the effect/switch 62, that is, processing of a cut point on the basis of the command issued from the edit control portion 110 and also controls effect processing, such as wipe or mosaic, in a predetermined range and processing for overlapping images corresponding to the telop or the picture in picture. In addition, the encoding control portion 124 controls the encoder 82 or the proxy encoder 83 to thereby control encoding processing of a baseband signal output from the effect/switch 62 and also supplies to the edit control portion 110 information indicating, for example, whether or not an encoding range has been extended in actual encoding.

In step S94, the edit control portion 110 determines whether or not encoding of the extracted edit element block has been executed including subsequent one or more edit element blocks on the basis of information on the encoding result supplied from the encoding control portion 124.

If it is determined that encoding of the extracted edit element block has been executed including subsequent one or more edit element blocks in step S94, the edit control portion 110 supplies information, which indicates that a plurality of edit element blocks have been encoded at a time, to the edit information table creating portion 108 in step S94. The edit information table creating portion 108 sets an edit element block of the corresponding portion as one block and updates an edit information table together with the information on the minimum encoding section.

If it is determined that encoding of the extracted edit element block has been executed including subsequent one or more edit element blocks, that is, encoding has been executed with only the extracted edit element block in step S94, or after the processing in step S95 is ended, the edit information table creating portion 108 determines that there is a past encoding result in the edit element block of the encoded portion in the edit information table in step S96.

In step S97, the edit control portion 110 determines whether or not encoding processing for all edit element blocks has been completed. If it is determined that encoding processing for all edit element blocks is not completed in step S97, the process returns to step S92 to repeat the subsequent processes. If it is determined that encoding processing for all edit element blocks has been completed in step S97, the processing is ended.

Since a bridge clip can be created only with one generation omission by such processing, a case in which omission of generation is performed in all generations or in all portions does not occur regardless of a combination method of edit elements. As a result, it is possible to prevent the image quality from deteriorating as compared with the known technique.

As described above, in the image processing apparatus 1 to which the present invention is applied, a bridge clip is created by decoding only a portion required for splicing of materials or giving of effects and then encoding a baseband signal, on which splicing of materials or giving of editing effects has been performed, again without encoding a baseband signal after editing from the beginning to the end after decoding the entire portion on the timeline. Furthermore, in the image processing apparatus 1, by setting an edit element block to be set as the same bridge clip on the basis of the configuration of edit elements on the timeline, it is possible to prevent an image from deteriorating as a result that the same portion is decoded and encoded repeatedly for the overlapping element, such as a cut point or an effect, existing in the neighborhood, for example. Furthermore, a minimum encoding section is set for every edit element block and editing processing including decoding and encoding is executed on the basis of the minimum encoding section and a bridge clip is created. In the image processing apparatus 1, it becomes possible to reduce deterioration of image quality and the editing time to the minimum level by adopting such a configuration.

Furthermore, in the image processing apparatus 1, an edit element block, its minimum encoding section, and the encoding result are managed as an edit information table so as to be associated with each other. Accordingly, a change in an edit element block caused by deletion and addition of an edit element can be easily traced, which makes it possible to meet modification of an edit element with minimum re-encoding.

Furthermore, in the image processing apparatus 1, an edit element block, its minimum encoding section, and a GUI indicating whether or not encoding of the edit element block has been completed are displayed so as to match on the timeline. Accordingly, the operator can perform editing processing more easily.

The series of processing described above may be executed by using hardware or software. In this case, the processing described above is executed by a personal computer 500 shown in FIG. 41.

Figure 41:
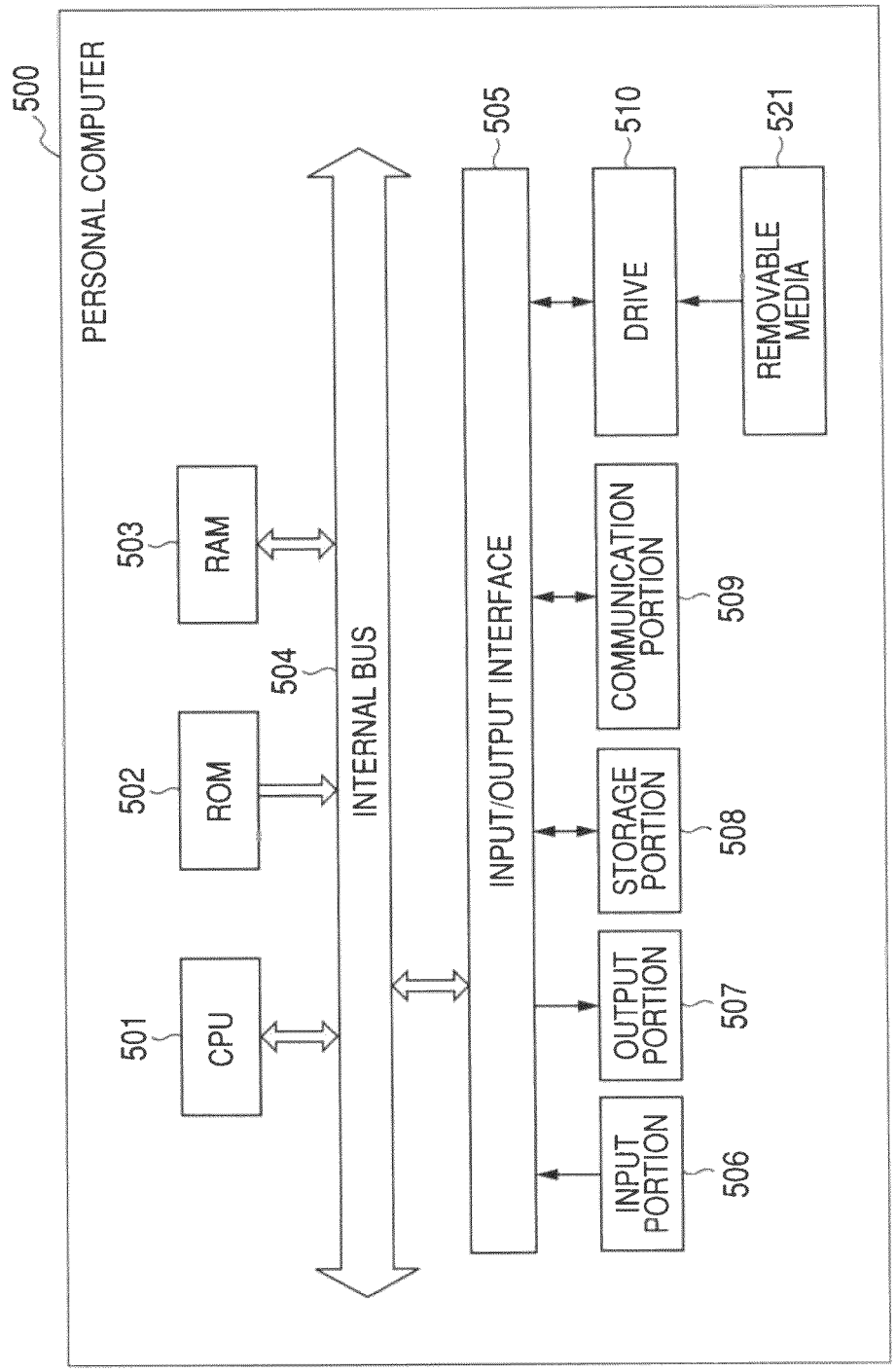
FIG. 41 is a block diagram illustrating the configuration of a personal computer.

In FIG. 41, a CPU (central processing unit) 501 executes various kinds of processing according to a program stored in a ROM (read only memory) 502 or a program loaded from a storage portion 508 to a RAM (random access memory) 503. Data required when the CPU 501 executes various kinds of processing is also appropriately stored in the RAM 503.

The CPU 501, the ROM 502, and the RAM 503 are connected to each other through an internal bus 504. In addition, an input/output interface 505 is also connected to the bus 504.

An input portion 506 such as a keyboard or a mouse, an output portion 507 including a speaker and a display such as a CRT or an LCD, the storage portion 508 such as a hard disk, and a communication portion 509 such as a modem or a terminal adaptor are connected to the input/output interface 505. The communication portion 509 performs communication processing through various kinds of networks including a telephone line and a CATV.

Furthermore, a drive 510 is connected to the input/output interface 505 as needed. In this case, a removable media 521, such as a magnetic disk, an optical disk, a magneto-optic disk, or a semiconductor memory, is appropriately mounted in the drive 510, and a computer program read from the removable media 521 is installed in the storage portion 508 as necessary.

Moreover, in this specification, steps describing a program recorded in a recording medium include not only processing performed in a time-sequential manner according to the described order but also processing performed in parallel or separately even if not necessarily performed in the time-sequential manner.

Furthermore, in this specification, a system refers to the entire apparatus configured to include a plurality of apparatuses.

In addition, embodiments of the present invention are not limited to the above-described embodiments, but various modifications may be made without departing from the spirit and scope of the present invention.

What is claimed is:

1. An editing apparatus that executes editing processing with an encoded stream as an edit material, comprising:
    an input means for receiving an operation input for designating the edit material used for editing, an editing effect, and start and end timing of the editing effect;
    an editing processing unit setting means for setting an editing processing unit, which is a section in which decoding and encoding are to be performed, of the edit material on the basis of the edit material and the editing effect input by the input means such that the editing effect, at least a part of which overlaps the edit material until the editing effect ends after starting of the editing effect, is included in the editing processing unit;
    a minimum encoding section setting means for setting a minimum encoding section that is a minimum time range, defined by a start time and an end time, required for encoding the editing processing unit set by the editing processing unit setting means, the minimum encoding section including a plurality of frames; and
    an after-editing stream creating means for creating a part of an after-editing encoded stream by decoding the edit material, giving the editing effect included in the editing processing unit, and performing encoding on the basis of setting of the minimum encoding section of the editing processing unit set by the minimum encoding section setting means.

2. The editing apparatus according to claim 1, further comprising:
    an edit information creating means for creating information regarding the editing processing unit set by the editing processing unit setting means and edit information in which the minimum encoding section of the editing processing unit set by the minimum encoding section setting means is described.

3. The editing apparatus according to claim 2, further comprising:
    a storage means for storing the edit information created by the edit information creating means,
    wherein when an operation instructing a change in a part of the edit material and the editing effect is input from the input means, the editing processing unit setting means sets the editing processing unit by using information regarding the editing processing unit, in which the configuration of the edit material and the configuration of the editing effect are equal, of the edit information stored in the storage means, and the minimum encoding section setting means sets the minimum encoding section in the editing processing unit by using information regarding the editing processing unit, in which the configuration of the edit material and the configuration of the editing effect are equal, of the edit information stored in the storage means.

4. The editing apparatus according to claim 1,
    wherein when a part of a plurality of minimum encoding sections set by the minimum encoding section setting means overlaps, the editing processing unit setting means resets the editing processing unit such that the editing processing unit corresponding to the overlapping minimum encoding sections becomes one editing processing unit.

5. The editing apparatus according to claim 1,
    wherein when a section including a plurality of editing processing units is encoded seamlessly in processing of the after-editing stream creating means for creating the after-editing encoded stream, the editing processing unit setting means resets the editing processing units such that the plurality of editing processing units seamlessly encoded becomes one editing processing unit, and the minimum encoding section setting means sets the minimum encoding section in the reset editing processing unit.

6. The editing apparatus according to claim 1,
    wherein the after-editing stream creating means creates a part of a first after-editing encoded stream corresponding to high-resolution image data and a part of a second after-editing encoded stream corresponding to low-resolution image data and executes encoding processing such that the second after-editing encoded stream created becomes ClosedGOP and an average amount of created codes per frame is equal.

7. The editing apparatus according to claim 6,
    wherein the after-editing stream creating means executes encoding processing of the first and second after-editing encoded streams such that GOP phases of the first and second after-editing encoded streams are equal.

8. The editing apparatus according to claim 6,
wherein the after-editing stream creating means executes encoding processing of the first and second after-editing encoded streams in a condition where the minimum GOP length of the first after-editing encoded stream is set to be larger than a maximum GOP length of the second after-editing encoded stream.

9. The editing apparatus according to claim 6,
wherein when a section including a plurality of editing processing units is encoded seamlessly in processing of the after-editing stream creating means for creating the second after-editing encoded stream, the editing processing unit setting means resets the editing processing units such that the plurality of editing processing units seamlessly encoded becomes one editing processing unit, and the minimum encoding section setting means sets the minimum encoding section in the reset editing processing unit.

10. The editing apparatus according to claim 1, further comprising:
a display control means for controlling display of a first timeline, in which the edit material used for editing and an editing effect are shown in a drawing and disposed on a time axis in a time-sequential manner, and a second timeline, in which information regarding the editing processing unit set by the editing processing unit setting means and the minimum encoding section of the editing processing unit set by the minimum encoding section setting means are disposed in a time-sequential manner so as to match the first timeline.

11. The editing apparatus according to claim 10,
wherein the display control means further controls display of information, which indicates whether or not the editing processing unit has been already encoded by the after-editing stream creating means, for every editing processing unit disposed on the second timeline.

12. The editing apparatus according to claim 1,
wherein the minimum encoding section setting means sets a start position of the minimum encoding section of the editing processing unit as a first frame of a GOP including a start frame of the editing effect with an earliest start time within the editing processing unit.

13. The editing apparatus according to claim 1,
wherein the minimum encoding section setting means sets an end position of the minimum encoding section of the editing processing unit as a picture immediately before an I picture belonging to a GOP including an end frame of the editing effect with a last end time within the editing processing unit.

14. The editing apparatus according to claim 1,
wherein the minimum encoding section setting means sets an end position of the minimum encoding section of the editing processing unit as an end position of a GOP including an end frame of the editing effect with a last end time within the editing processing unit.

15. The editing apparatus according to claim 1,
wherein the minimum encoding section setting means sets an end position of the minimum encoding section of the editing processing unit as a picture immediately before an I picture belonging to a next GOP of a GOP including an end frame of the editing effect with a last end time within the editing processing unit.

16. The editing apparatus according to claim 1,
wherein the minimum encoding section setting means sets an end position of the minimum encoding section of the editing processing unit as an end position of a next GOP of a GOP including an end frame of the editing effect with a last end time within the editing processing unit.

17. An editing method of an editing apparatus that executes editing processing with an encoded stream as an edit material, comprising the steps of:
receiving an operation input for designating the edit material used for editing, an editing effect, and start and end timing of the editing effect;
setting an editing processing unit, which is a section in which decoding and encoding are to be performed, of the edit material on the basis of the edit material and the editing effect such that the editing effect, at least apart overlaps the edit material until the editing effect ends after starting of the editing effect, is included in the editing processing unit;
setting a minimum encoding section that is a minimum time range, defined by a start time and an end time, required for encoding the set editing processing unit, the minimum encoding section including a plurality of frames; and
creating a part of an after-editing encoded stream by decoding the edit material, giving the editing effect included in the editing processing unit, and performing encoding on the basis of setting of the minimum encoding section of the editing processing unit.

18. An editing apparatus that executes editing processing with an encoded stream as an edit material, comprising:
an input portion that receives an operation input for designating the edit material used for editing, an editing effect, and start and end timing of the editing effect;
circuitry configured to
set an editing processing unit, which is a section in which decoding and encoding are to be performed, of the edit material on the basis of the edit material and the editing effect input by the input portion such that the editing effect, at least a part of which overlaps the edit material until the editing effect ends after starting of the editing effect, is included in the editing processing unit;
set a minimum encoding section that is a minimum time range, defined by a start time and an end time, required for encoding the editing processing unit set by the circuitry, the minimum encoding section including a plurality of frames; and
create a part of an after-editing encoded stream by decoding the edit material, give the editing effect included in the editing processing unit, and perform encoding on the basis of setting of the minimum encoding section of the editing processing unit set by the circuitry.

19. The editing apparatus according to claim 1, wherein the minimum encoding section is determined based on a range of sequential video frames that includes the editing effect.

* * * * *